(12) United States Patent
Park

(10) Patent No.: US 11,563,342 B2
(45) Date of Patent: Jan. 24, 2023

(54) METHOD FOR DETECTING FOREIGN OBJECT USING SENSOR COIL AND ELECTRONIC DEVICE

(71) Applicant: Samsung Electronics Co., Ltd., Suwon-si (KR)

(72) Inventor: Seho Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/506,304

(22) Filed: Oct. 20, 2021

(65) Prior Publication Data
US 2022/0131421 A1  Apr. 28, 2022

Related U.S. Application Data

(60) Provisional application No. 63/104,799, filed on Oct. 23, 2020.

(30) Foreign Application Priority Data

Jul. 1, 2021  (KR) .................. 10-2021-0086482

(51) Int. Cl.
 *H02J 50/60*  (2016.01)
 *H02J 50/80*  (2016.01)
(52) U.S. Cl.
 CPC .............. *H02J 50/60* (2016.02); *H02J 50/80* (2016.02)
(58) Field of Classification Search
 None
 See application file for complete search history.

(56) References Cited

U.S. PATENT DOCUMENTS

| 11,271,436 B2 * | 3/2022 | Kim ................. H02J 50/80 |
| 11,336,119 B2 * | 5/2022 | Smith ................. H02J 7/025 |
| 2013/0176023 A1 | 7/2013 | Komiyama |
| 2014/0084857 A1 | 3/2014 | Liu et al. |

(Continued)

FOREIGN PATENT DOCUMENTS

| JP | 6019581 B2 | 10/2016 |
| JP | 6273615 B2 | 1/2018 |
| KR | 10-2017-0140685 A | 12/2017 |

OTHER PUBLICATIONS

International Search Report dated Jan. 25, 2022, issued in International Application No. PCT/KR2021/014725.

*Primary Examiner* — Thomas J. Hiltunen
*Assistant Examiner* — Khareem E Almo
(74) *Attorney, Agent, or Firm* — Jefferson IP Law, LLP

(57) ABSTRACT

An electronic device capable of transmitting and receiving wireless power is provided. The electronic device includes a wireless power transfer (WPT) coil, a sensor coil surrounding the WPT coil, and a processor operatively coupled to the WPT coil and the sensor coil. The processor may be configured to control to transmit and receive power by using the WPT coil, perform a ping operation by using the sensor coil, control to measure a waveform of a current or voltage of the sensor coil while or after performing the ping operation using the sensor coil, control to check a Q factor of the sensor coil based on the measured waveform, identify the presence of a foreign object based on the checked Q factor, and control the power transmission using the WPT coil based on a result of the determination of the presence of the foreign object.

20 Claims, 25 Drawing Sheets

(56) References Cited

U.S. PATENT DOCUMENTS

| | | | |
|---|---|---|---|
| 2014/0191568 A1* | 7/2014 | Partovi | H02M 3/33515 |
| | | | 307/31 |
| 2015/0145529 A1 | 5/2015 | Urano | |
| 2015/0355359 A1 | 12/2015 | Miyashita | |
| 2017/0288458 A1 | 10/2017 | Lee et al. | |
| 2017/0338861 A1 | 11/2017 | Kim et al. | |
| 2018/0026482 A1 | 1/2018 | Asano et al. | |
| 2018/0233966 A1 | 8/2018 | Yang et al. | |
| 2019/0393731 A1* | 12/2019 | Maniktala | H02J 50/20 |
| 2020/0227951 A1 | 7/2020 | Park et al. | |
| 2020/0259369 A1* | 8/2020 | Stingu | H02J 50/50 |
| 2020/0266670 A1 | 8/2020 | Ha et al. | |
| 2020/0266671 A1 | 8/2020 | Choi et al. | |
| 2020/0295606 A1* | 9/2020 | Park | H01F 38/14 |
| 2022/0006332 A1* | 1/2022 | Stingu | H02J 50/005 |

* cited by examiner

METHOD FOR DETECTING FOREIGN OBJECT USING SENSOR COIL AND ELECTRONIC DEVICE

CROSS-REFERENCE TO RELATED APPLICATIONS

This application is based on and claims priority under 35 U.S.C. § 119(e) of a U.S. Provisional application Ser. No. 63/104,799, filed on Oct. 23, 2020, in the U.S. Patent and Trademark Office, and under 35 U.S.C. § 119(a) of a Korean patent application number 10-2021-0086482, filed on Jul. 1, 2021, in the Korean Intellectual Property Office, the disclosure of each of which is incorporated by reference herein in its entirety.

BACKGROUND

1. Field

The disclosure relates to a method for detecting a foreign object using a sensor coil and an electronic device including the method.

2. Description of Related Art

An electronic device may be wirelessly charged or may be charged in a contactless way by using a wireless power transfer technology. The wireless power transfer technology may be a technology in which power is wirelessly transferred from a power transmission device to a power reception device and the battery of the power reception device is charged without a connection using a separate connector between the power reception device and the power transmission device. The wireless power transfer technology may include a magnetic induction method and a magnetic resonance method, and may include wireless power transfer technologies using various methods in addition to the magnetic induction method and the magnetic resonance method.

The above information is presented as background information only to assist with an understanding of the disclosure. No determination has been made, and no assertion is made, as to whether any of the above might be applicable as prior art with regard to the disclosure.

SUMMARY

If power is wirelessly transmitted and received between electronic devices, there is a difficulty in that power transmission must be stopped in order to detect a foreign object.

Aspects of the disclosure are to address at least the above-mentioned problems and/or disadvantages and to provide at least the advantages described below. Accordingly, an aspect of the disclosure is to provide a method of detecting a foreign object using a sensor coil and an electronic device including the method, which detect a foreign object by using a sensor coil formed to surround a wireless power transfer (WPT) coil.

Additional aspects will be set forth in part in the description which follows and, in part, will be apparent from the description, or may be learned by practice of the presented embodiments.

In accordance with an aspect of the disclosure, an electronic device capable of transmitting and receiving wireless power is provided. The electronic device includes a WPT coil, a sensor coil surrounding the WPT coil, and a processor operatively coupled to the WPT coil and the sensor coil. The processor may be configured to control to transmit and receive power by using the WPT coil, perform a ping operation by using the sensor coil, control to measure a waveform of a current or voltage of the sensor coil while or after performing the ping operation using the sensor coil, control to check a Q factor of the sensor coil based on the measured waveform, identify the presence of a foreign object based on the checked Q factor, and control the power transmission using the WPT coil based on a result of the identification of the presence of the foreign object.

In accordance with another aspect of the disclosure, a method of detecting, by an electronic device including a WPT coil and a sensor coil surrounding the WPT coil and capable of transmitting and receiving wireless power, a foreign object using a sensor coil is provided. The method includes controlling to transmit and receive power by using the WPT coil, performing a ping operation by using the sensor coil, controlling to measure a waveform of a current or voltage of the sensor coil while or after performing the ping operation using the sensor coil, controlling to check a Q factor of the sensor coil based on the measured waveform, identify the presence of a foreign object based on the checked Q factor, and controlling the power transmission using the WPT coil based on a result of the identification of the presence of the foreign object.

The method of detecting a foreign object using a sensor coil and the electronic device including the method according to various embodiments of the disclosure can continuously perform a wireless power transfer operation between electronic devices using the WPT coil by detecting a foreign object by using the sensor coil formed to surround the WPT coil.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
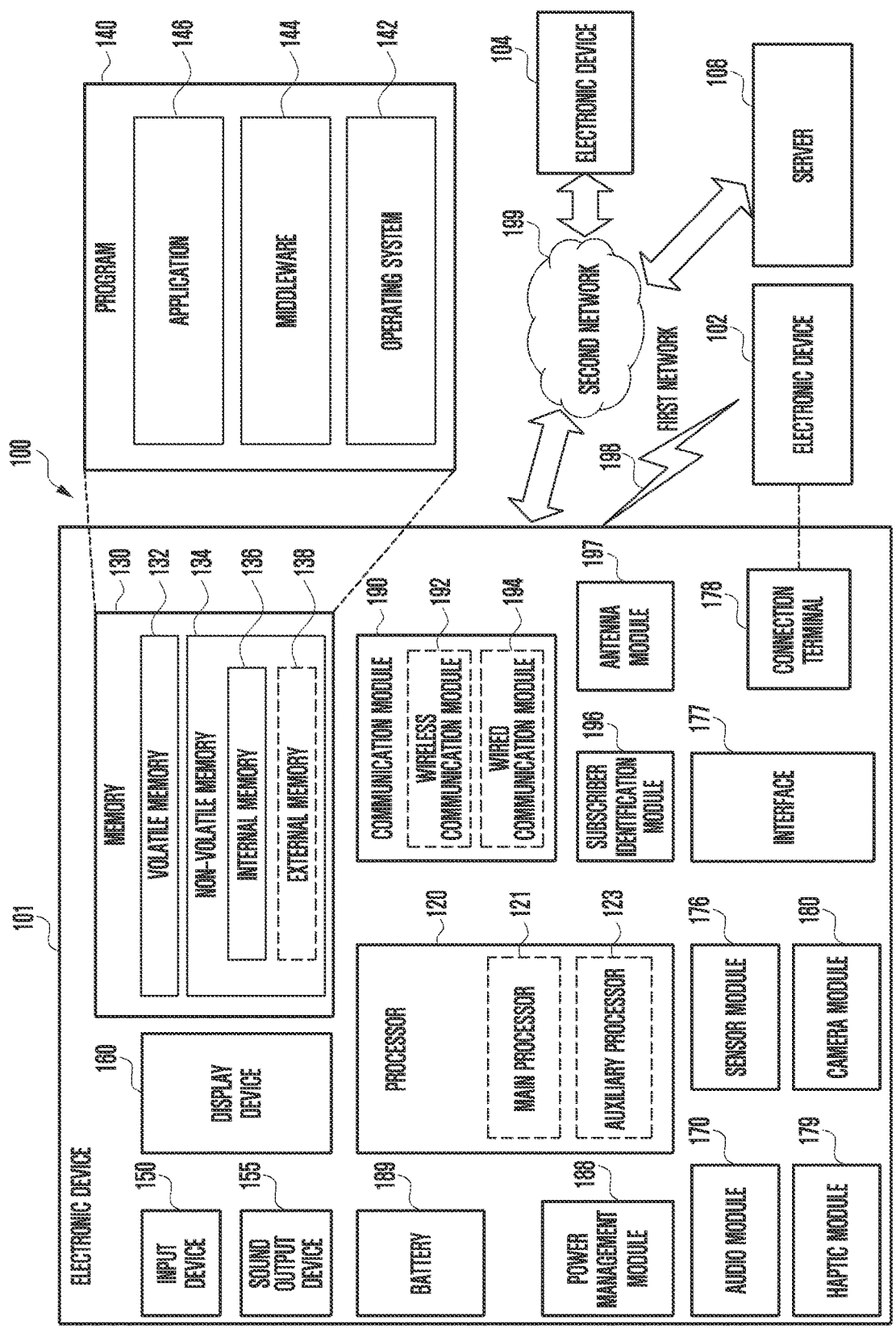
FIG. 1 is a block diagram of an electronic device within a network environment according to an embodiment of the disclosure.

FIG. 1 is a block diagram illustrating an electronic device in a network environment 100 according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108), Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (LMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of lens or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RTIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MFC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
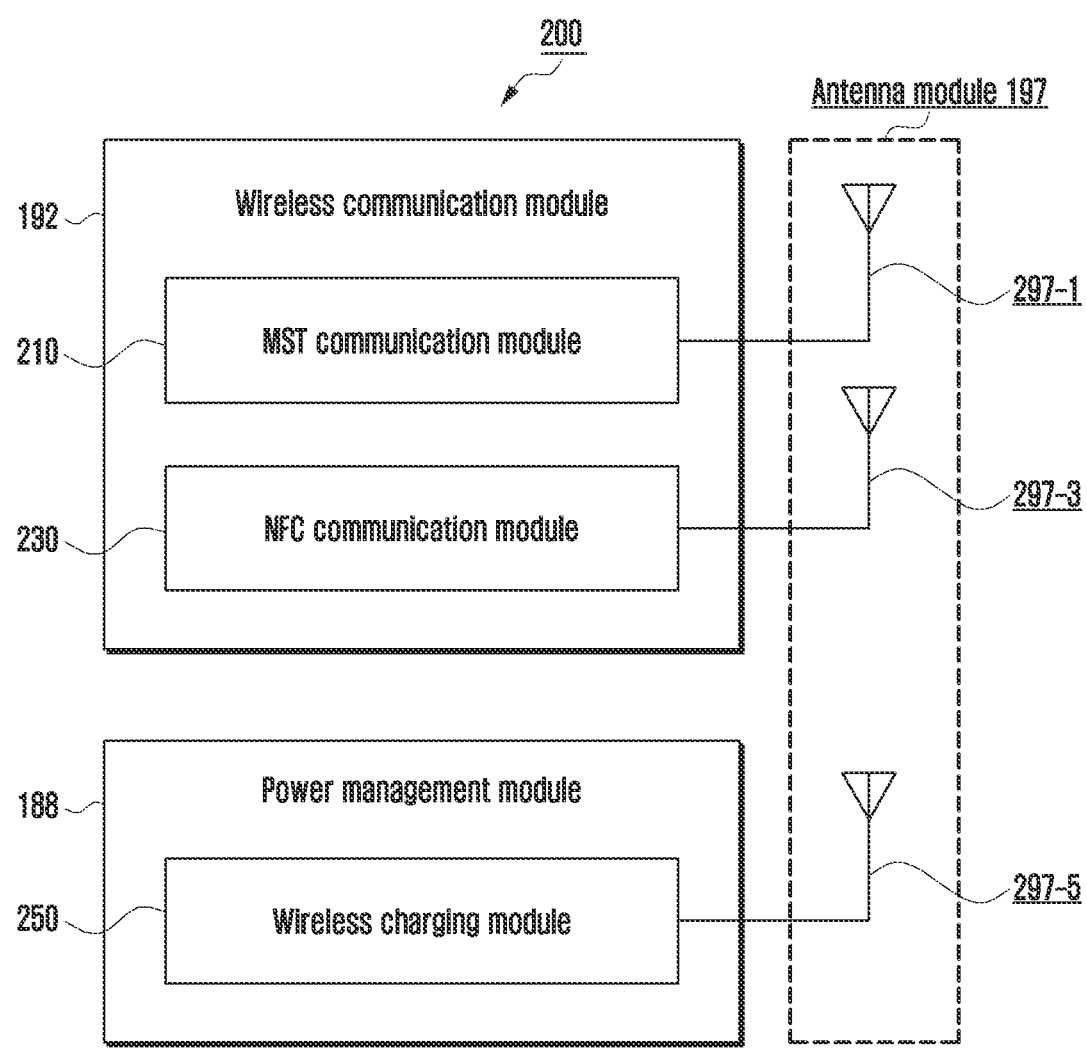
FIG. 2 is a block diagram of a wireless communication module, a power management module, and an antenna module of an electronic device according to an embodiment of the disclosure.

FIG. 2 is a block diagram of a wireless communication module, a power management module, and an antenna module of the electronic device according to an embodiment of the disclosure.

Referring to FIG. 2, in a block diagram 200, the wireless communication module 192 may include a magnetic secure transmission (MST) communication module 210 or a near field communications (NFC) communication module 230. The power management module 188 may include a wireless charging module 250. In such a case, an antenna module 297 may include a plurality of antennas, including an MST antenna 297-1 connected to the MST communication module 210, an NFC antenna 297-3 connected to the NFC communication module 230, and a wireless charging antenna 297-5 connected to the wireless charging module 250. Elements redundant with those in FIG. 1 are omitted or described in brief for convenience of description.

The MST communication module 210 may receive, from the processor 120, a signal including control information or payment information such as card information, may generate a magnetic signal corresponding to a signal received through the MST antenna 297-1, and may transmit the generated magnetic signal to the external electronic device 102 (e.g., a point-of-sale (POS) device). According to an embodiment, in order to generate the magnetic signal, the MST communication module 210 may include a switching module including one or more switches (not illustrated) connected to the MST antenna 297-1, and may change a direction of a voltage or current supplied to the MST antenna 297-1 in response to the received signal by controlling the switching module, A direction of a magnetic signal (e.g., a magnetic field) transmitted through the MST antenna 297-1 may be changed in response to a change in the direction of the voltage or current. When the magnetic signal in the state in which the direction is changed is detected in the external electronic device 102, a magnetic card corresponding to a received signal (e.g., card information) may cause an effect (e.g., a waveform) similar to a magnetic field generated as the magnetic card is swiped by the card reader of the electronic device 102. According to an embodiment, payment-related information and a control signal received by the electronic device 102 in the form of a magnetic signal may be transmitted to the external server 108 (e.g., a payment server) over the network 199, for example.

The NFC communication module 230 may obtain, from the processor 120, a signal including control information or payment information such as card information, and may transmit the obtained signal to the external electronic device 102 through the NFC antenna 297-3. According to an embodiment, the NFC communication module 230 may receive such a signal transmitted by the external electronic device 102 through the NFC antenna 297-3.

The wireless charging module 250 may wirelessly transmit power to the external electronic device 102 (e.g., a mobile phone or a wearable device) or may wirelessly receive power from the external electronic device 102 (e.g., a wireless charging device) through the wireless charging antenna 297-5. The wireless charging module 250 may support one or more of various wireless charging methods including a magnetic resonance method or a magnetic induction method, for example.

According to an embodiment, some of the MST antenna 297-1, the NFC antenna 297-3, or the wireless charging antenna 297-5 may share at least some of a radiation unit. For example, a radiation unit of the MST antenna 297-1 may be used as a radiation unit of the NFC antenna 297-3 or the wireless charging antenna 297-5, and vice versa. In such a case, the antenna module 297 may include a switching circuit (not illustrated) configured to selectively connect (e.g., close) or separate (e.g., open) at least some of the antennas 297-1, 297-3, or 297-3 under the control of the wireless communication module 192 (e.g., the MST communication module 210 or the NFC communication module 230) or the power management module 188 (e.g., the wireless charging module 250). For example, if the electronic device 101 uses a wireless charging function, the NFC communication module 230 or the wireless charging module 250 may temporarily separate, from the NFC antenna 297-3, at least some region of a radiation unit shared by the NFC antenna 297-3 and the wireless charging antenna 297-5 and may connect the at least some region of the radiation unit to the wireless charging antenna 297-5 by controlling the switching circuit.

According to an embodiment, at least one function of the MST communication module 210, the NFC communication module 230, or the wireless charging module 250 may be controlled by an external processor (e.g., the processor 120). According to an embodiment, designated functions (e.g., payment functions) of the MST communication module 210 or the NFC communication module 230 may be performed in a trusted execution environment (TEE), The TEE according to various embodiments may form an execution environment in which at least some designated region of the memory 130 is allocated in order to be used to perform a function (e.g., a financial transaction or personal information-related function) that requires a relatively high level of security, for example. In such a case, access to the designated region may be limitedly permitted depending on a subject that approaches the designated region or an application executed in the TEE, for example.

Figure 3:
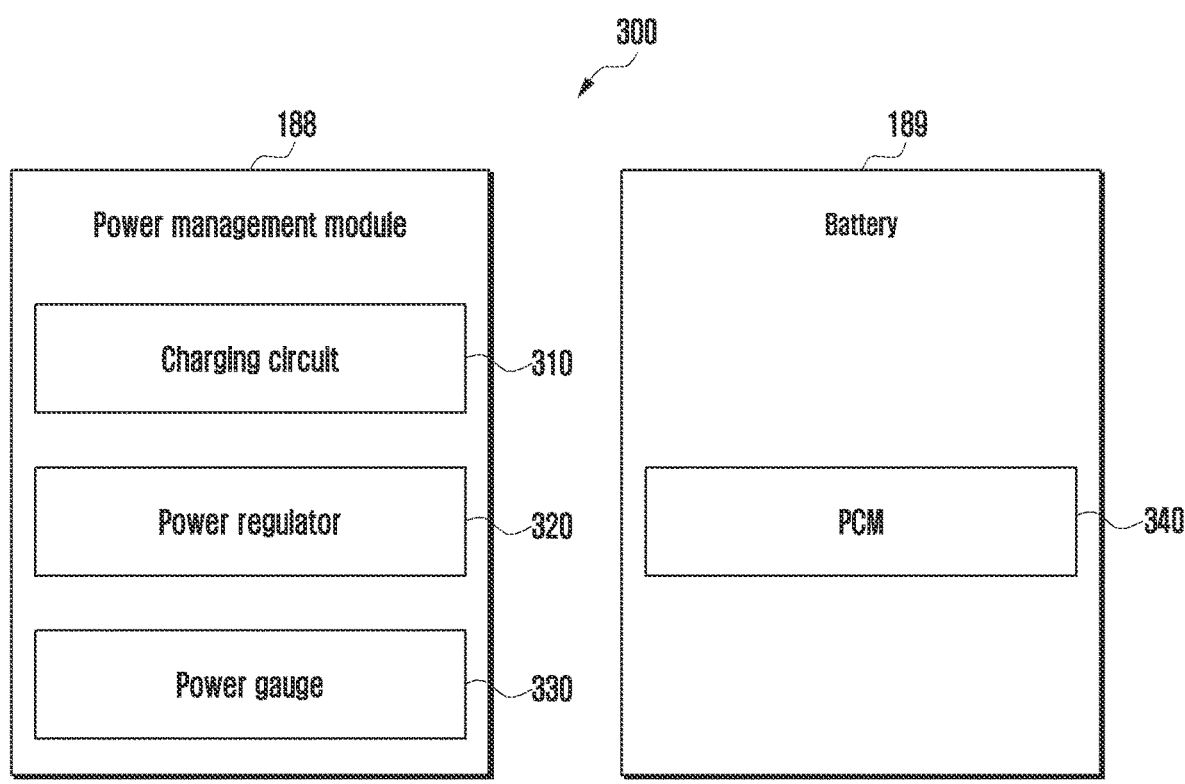
FIG. 3 is a block diagram of a power management module and a battery according to an embodiment of the disclosure.

FIG. 3 is a block diagram of a power management module and a battery according to an embodiment of the disclosure.

Referring to FIG. 3, in a block diagram 300, the power management module 188 may include a charging circuit 310, a power regulator 320, or a power gauge 330. The charging circuit 310 may charge the battery 189 by using power supplied from an external power source for the electronic device 101. According to an embodiment, the charging circuit 310 may select a charging method (e.g., normal charging or quick charging) based on the type (e.g., a power adaptor, a USB or wireless charging) of an external power source, a size (e.g., about 20 watt or more) of power which may be supplied from an external power source, or at least some of attributes of the battery 189, and may charge the battery 189 by using the selected charging method. The external power source may be connected to the electronic device 101 by using a wire through the connection terminal 178 or may be wirelessly connected to the electronic device 101 through the antenna module 197, for example.

The power regulator 320 may generate a plurality of pieces of power having different voltage or current levels by regulating a voltage or current level of power supplied from the external power source or the battery 189, for example. The power regulator 320 may regulate power of the external power source or the battery 189 to a voltage or current level suitable for each of some of elements included in the electronic device 101. According to an embodiment, the power regulator 320 may be implemented in the form of a low drop-out (LDC) regulator or a switching regulator. The power gauge 330 may measure use state information (e.g., a capacity, a charging and discharging count, a voltage or a temperature of the battery 189) of the battery 189.

The power management module 188 may identify charging state information (e.g., lifespan, an overvoltage, a low voltage, an overcurrent, overcharge, overdischarging, overheat, a short-circuit, or swelling) related to the charging of the battery 189 based on at least some of the measured use state information by using the charging circuit 310, the power regulator 320, or the power gauge 330, for example. The power management module 188 may identify whether the battery 189 is normal or abnormal based on at least some of the identified charging state information. When the state of the battery 189 is identified to be abnormal, the power management module 188 may regulate the charging of the battery 189 (e.g., reduce a charging current or voltage or stop charging). According to an embodiment, at least some of functions of the power management module 188 may be performed by an external controller (e.g., the processor 120).

According to an embodiment, the battery 189 may include a battery protection circuit module (PCM) 340. The battery PCM 340 may perform one or more of various functions (e.g., a prevention function) for preventing performance degradation of the battery 189 or damage thereto. The battery PCM 340 may be configured as at least some of a battery management system (BMS) capable of performing various functions, additionally or alternatively including, cell balancing, the measurement of a capacity of the battery, the measurement of a charging and discharging count, the measurement of a temperature, or the measurement of a voltage.

According to an embodiment, at least some of the use state information or charging state information of the battery 189 may be measured using a sensor (e.g., a temperature sensor) corresponding to the sensor module 376, the power gauge 330, or the power management module 188. According to an embodiment, the corresponding sensor (e.g., a temperature sensor) of the sensor module 176 may be included as a part of the battery PCM 340 or may be disposed near the battery 189 as a separate device.

Figure 4A:
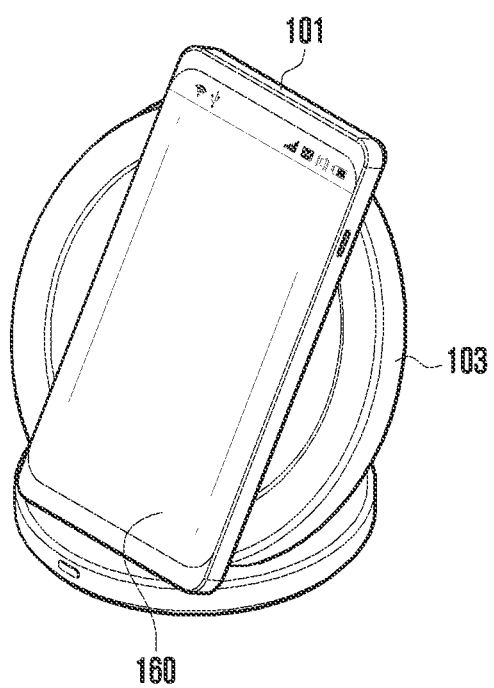
FIG. 4A is a diagram illustrating a wireless charging operation between an electronic device and a first external electronic device according to an embodiment of the disclosure.

FIG. 4A is a diagram illustrating a wireless charging operation between an electronic device and a first external electronic device according to an embodiment of the disclosure.

Referring to FIG. 4A, the electronic device 101 and the first external electronic device 103 may transmit and receive wireless power. The electronic device 101 may be a power reception device, and the first external electronic device 103 may be a power transmission device. Each of the electronic device 101 and the first external electronic device 103 may transmit and receive power by using a wireless power transfer (WPT) coil included therein. For example, the first external electronic device 103 may transmit power to the electronic device 101 by using the WPT coil. The electronic device 101 may receive power from the first external electronic device 103 by using the WPT coil. For example, the electronic device 101 may be a smartphone, and the first external electronic device 103 may be a wireless charger.

Figure 4B:
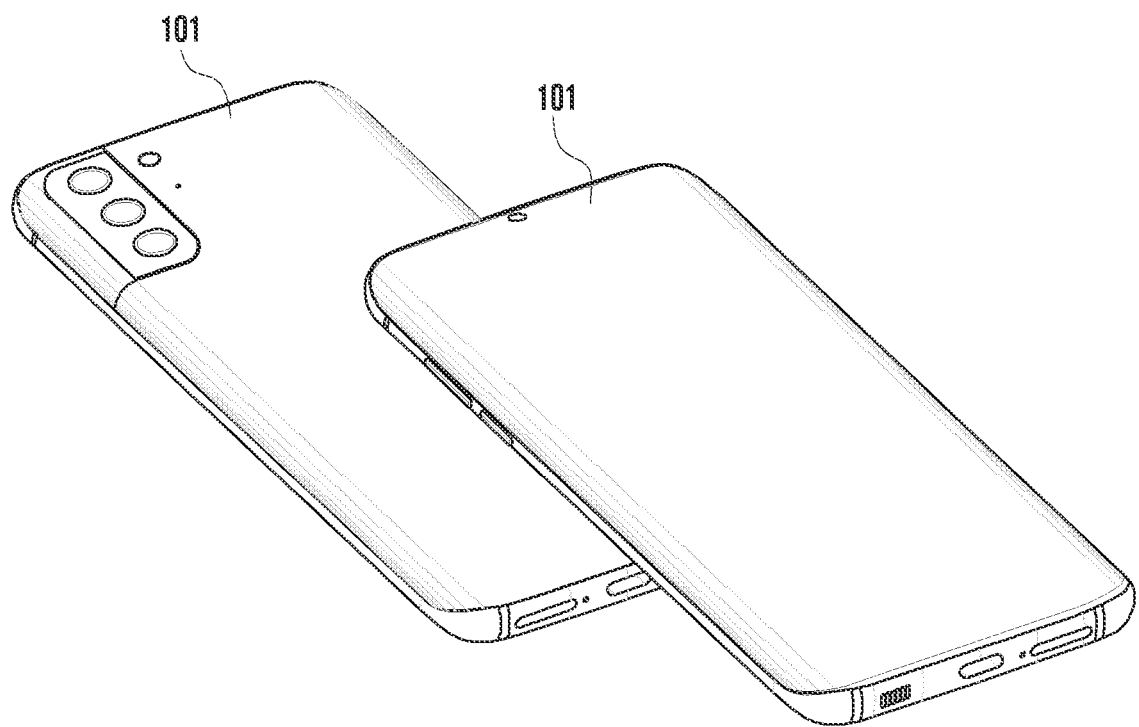
FIG. 4B is a diagram illustrating a wireless charging operation between electronic devices according to an embodiment of the disclosure.

FIG. 4B is a diagram illustrating a wireless charging operation between electronic devices according to an embodiment of the disclosure.

Referring to FIG. 4B, the electronic devices 101 may transmit and receive wireless power each other. At least one of the electronic devices 101 may be a power reception device, and at least one of the electronic devices 101 may be a power transmission device. Each of the electronic devices 101 may transmit and receive power by using a WPT coil included therein.

Figure 4C:
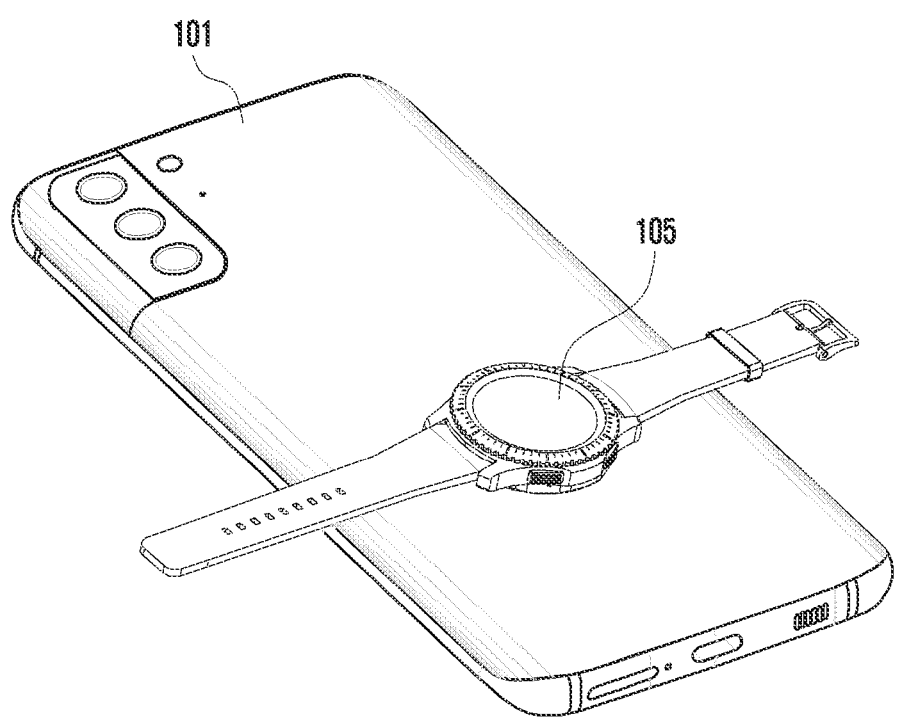
FIG. 4C is a diagram illustrating a wireless charging operation between an electronic device and a second external electronic device according to an embodiment of the disclosure.

FIG. 4C is a diagram illustrating a wireless charging operation between the electronic device and a second external electronic device according to an embodiment of the disclosure.

Referring to FIG. 4C, the electronic device 101 and the second external electronic device 105 may transmit and receive wireless power each other. The second external electronic device 105 may be a power reception device, and the electronic device 101 may be a power transmission device. Each of the electronic device 101 and the second external electronic device 105 may transmit and receive power by using a PSC coil included therein. For example, the electronic device 101 may transmit power to the second external electronic device 105 by using the WPT coil, and the second external electronic device 105 may receive power from the electronic device 101 by using the WPT coil. For example, the electronic device 101 may be a smartphone, and the second external electronic device 105 may be an earbud or a wearable device.

Figure 5A:
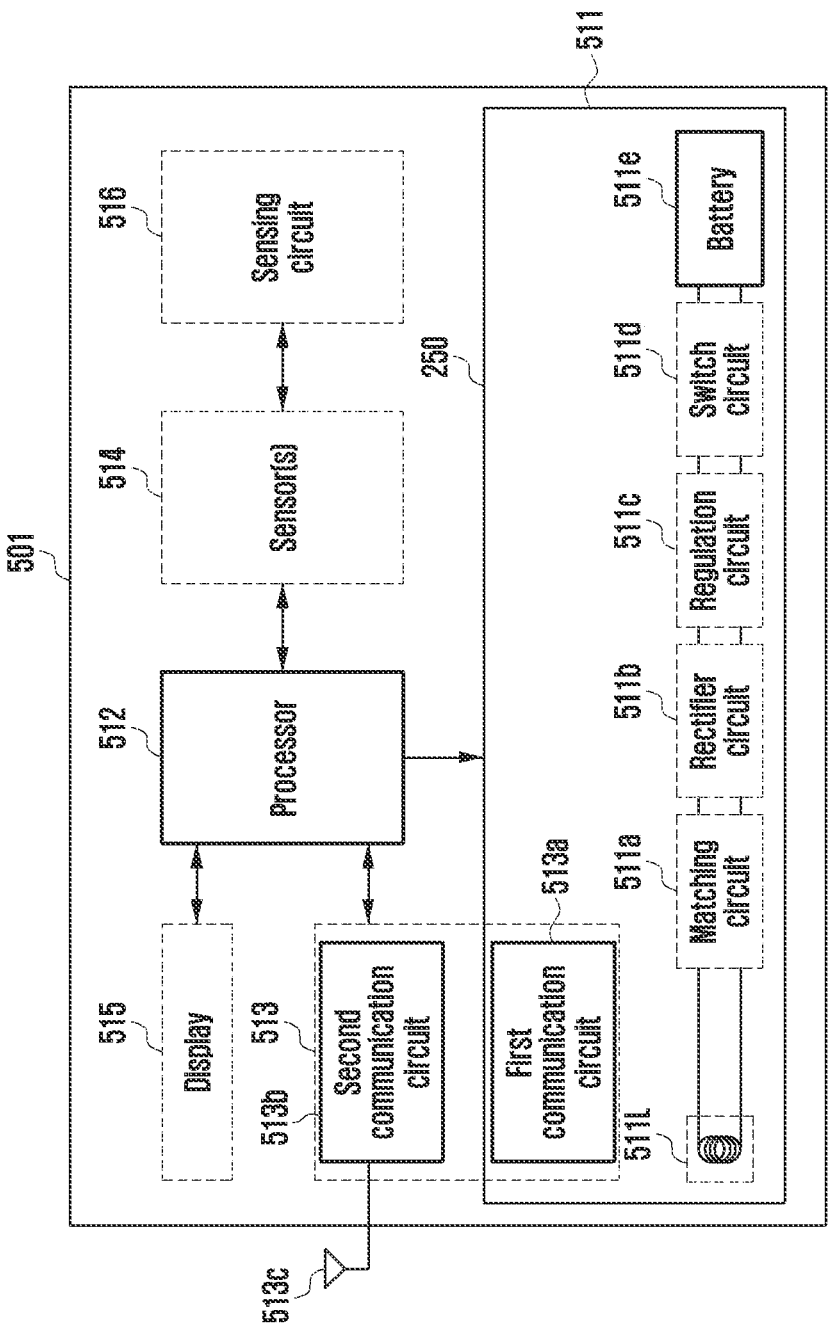
FIG. 5A is a block diagram schematically illustrating a first electronic device according to an embodiment of the disclosure.

FIG. 5A is a block diagram schematically illustrating a first electronic device e.g., the electronic device 101 in FIGS. 1 and 4A) according to an embodiment of the disclosure.

Figure 5B:
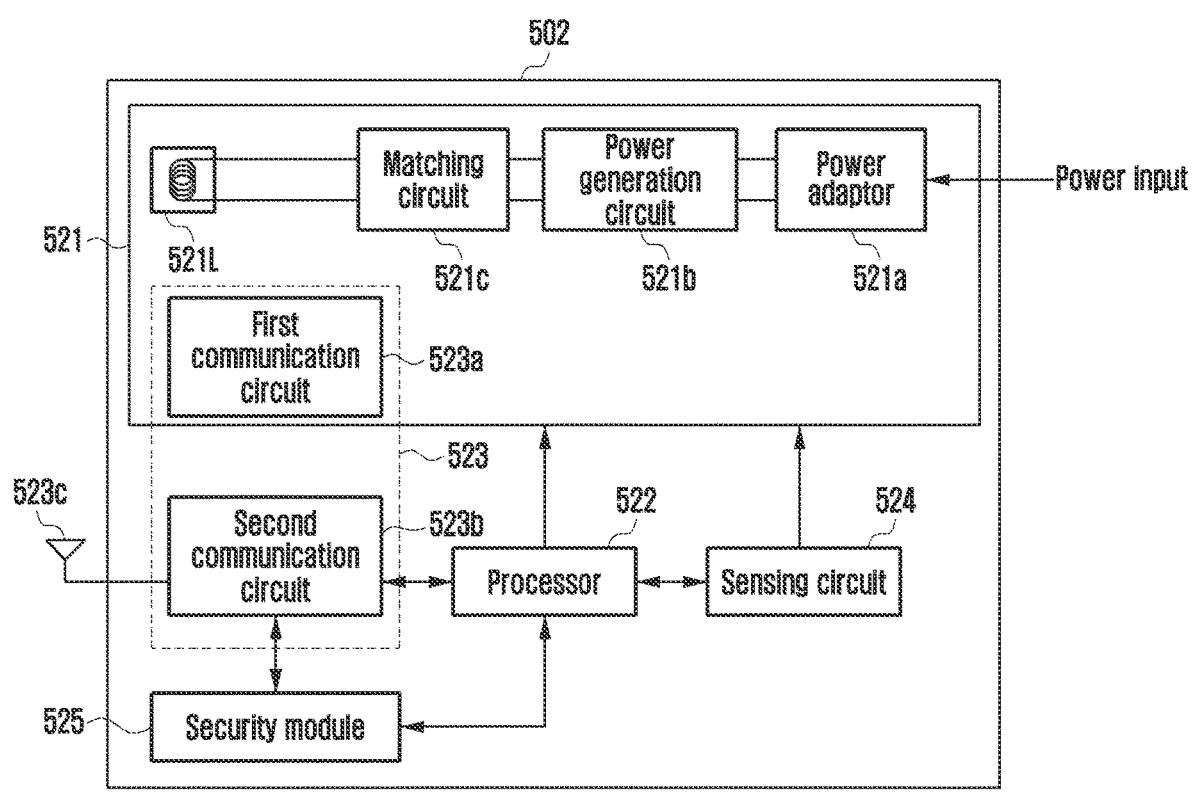
FIG. 5B is a block diagram schematically illustrating a second electronic device according to an embodiment of the disclosure.

FIG. 5B is a block diagram schematically illustrating a second electronic device (e.g., the first external electronic device 103 in FIG. 4B) according to an embodiment of the disclosure.

According to various embodiments, referring to FIGS. 5A and 5B, a second electronic device 502 (e.g., the first external electronic device 103 in FIG. 4A) (hereinafter also referred to as a "power transmission device") may wirelessly supply power to a first electronic device 501 (e.g., the electronic device 101 in FIGS. 1 and 4A) (hereinafter also referred to as a "power reception device"). The first electronic device 501 may wirelessly receive the power. Roles in the wireless charging functions of the first electronic device 501 and the second electronic device 502 are not limited to those described with reference to FIGS. 5A and 5B, and may also be applied to a case where the roles are opposite. For example, the second electronic device 502 (e.g., a smartphone or a wearable device) may play a role as a power reception device, and the first electronic device 501 (e.g., a smartphone) may play a role as a power transmission device.

According to various embodiments, the first electronic device 501 (e.g., the electronic device 101 in FIGS. 1 and 4A) may include a power reception circuit 511, a processor 512 (e.g., the processor 120 in FIG. 1), a communication circuit 513 (e.g., the communication module 190 in FIG. 1), a sensor(s) 514 (e.g., the sensor module 176 in FIG. 1), a display 515 (e.g., the display device 160 in FIG. 1) and/or a sensing circuit 516. A description of elements of the first electronic device 501 (e.g., the electronic device 101 in FIGS. 1 and 4A), which correspond to elements of the second electronic device 502 (e.g., the first external electronic device 103 in FIG. 4A), may be partially omitted.

According to various embodiments, the power reception circuit 511 may include a reception (Rx) coil 511L for wirelessly receiving power from a power transmission device (e.g., the second electronic device 502), a matching circuit 511a, a rectifier circuit 511b for rectifying received AC power as DC, a regulation circuit 511c for regulating a charging voltage, a switch circuit 511d and/or a battery 511e (e.g., the battery 189 in FIG. 1). For example, the power reception circuit 511 may be included in a receiver integrated circuit (RxIC).

According to various embodiments, the communication circuit 513 may include at least one of a first communication circuit 513a and a second communication circuit 513b. The first communication circuit 513a may communicate with the second electronic device 502 (e.g., the first external electronic device 103 in FIG. 4A) through the Rx coil 511L. The second communication circuit 513b may communicate with the second electronic device 502 (e.g., the first external electronic device 103 in FIG. 4A) by using any one of various short-distance communication methods, such as Bluetooth, Bluetooth low energy (BLE), Wi-Fi, Wi-Fi direct, and near field communication (NFC). The second communication circuit 513b may include an antenna 513c capable of communicating with an external electronic device (e.g., the first electronic device 501). For example, the communication circuit 513 may be included in the receiver integrated circuit (RxIC).

According to various embodiments, the first communication circuit 513a may communicate with a first communication circuit 523a of the second electronic device 502 (e.g., the electronic device 102 in FIG. 1) by using a frequency band identical with or neighboring a frequency band of the power signal in the Rx coil 511L, for example (e.g., an inband method). In various embodiments, the first communication circuit 513a of the first electronic device 501 may communicate with the first communication circuit 523a of the second electronic device 502 by using the inband method, for example. The first communication circuit 513a of the first electronic device 501 may communicate with the second electronic device 502 by using the Rx coil 511L for receiving power from the second electronic device 502 (e.g., the first external electronic device 103 in FIG. 4A). The first electronic device 501 and the second electronic device 502 may communicate with each other by using the respective coils 511L and 521L for power transmission and reception.

According to various embodiments, when receiving a signal or power transmitted by the second electronic device 502 (e.g., the first external electronic device 103 in FIG. 4A) through the coil 511L, the first electronic device 501 (e.g., the electronic device 101 in FIGS. 1 and 4A) may control the communication circuit 513 to generate device information or power information of the first electronic device 501 (e.g., the electronic device 101 in FIGS. 1 and 4A), which will be transmitted to the second electronic device 502 (e.g., the first external electronic device 103 in FIG. 4A). The generated power information may be transmitted to the second electronic device 502 (e.g., the first external electronic device 103 in FIG. 4A) through the coil 511L. Alternatively, the generated power information may be transmitted to the second electronic device 502 (e.g., the first external electronic device 103 in FIG. 4A) through a separate antenna. For example, the power information may be information (e.g., received power, a voltage, or a current state) related to charging power of the first electronic device 501 (e.g., the electronic device 101 in FIGS. 1 and 4A) or may include output power, output voltage information, or charging current information of the second electronic device 502 (e.g., the first external electronic device 103 in FIG. 4A) or information associated therewith. For example, the power information may include information that requests a change in transmission power of the second electronic device 502 (e.g., the first external electronic device 103 in FIG. 4A).

According to various embodiments, the first electronic device 501 (e.g., the electronic device 101 in FIGS. 1 and 4A) may charge the battery 511e through a charging circuit (e.g., the charging circuit 310 in FIG. 3) by using power received from the power transmission device (e.g., the second electronic device 502) through the power reception circuit 511. When a magnetic field is formed in a coil (e.g., a transmission (Tx) coil 521L) of the second electronic device 502 (e.g., the first external electronic device 103 in FIG. 4A), a current may flow into a coil (e.g., an Rx coil 511L) of the first electronic device 501 (e.g., the electronic device 101 in FIGS. 1 and 4A) due to electromagnetic induction or resonance. The battery 511e may be charged through the charging circuit by using the current.

According to various embodiments, the sensing circuit 516 may detect that the first electronic device 501 (e.g., the electronic device 101 in FIGS. 1 and 4A) is detached from the power transmission device 502. For example, the sensing circuit 516 may include at least one of a hardware detachment sensing circuit or a software detachment sensing algorithm. For example, although the detachment sensing circuit is not included upon fabrication, the first electronic device 501 (e.g., the electronic device 101 in FIGS. 1 and 4A) may perform updates related to a detachment sensing function through software updates, and may use the sensing circuit 516.

According to various embodiments, the sensing circuit 516 may detect the second electronic device 502 (e.g., the first external electronic device 103 in FIG. 4A) by detecting a search signal or received power from the second electronic device 502 (e.g., the first external electronic device 103 in FIG. 4A). The sensing circuit 516 may detect a change in the signal of the coil 511L, the matching circuit 511a or an input/output stage of the rectifier circuit 511b based on a signal of the coil 511L generated by a signal output by the second electronic device 502 (e.g., the first external electronic device 103 in FIG. 4A). The sensing circuit 516 may obtain information on a movement of the first electronic device 501 (e.g., the electronic device 101 in FIGS. 1 and 4A). The sensing circuit 516 may obtain information on a temperature from at least one sensor 514 (e.g., a temperature sensor or a heart rate monitor (HRM) sensor) For example, the sensing circuit 516 may be included in the receiver integrated circuit (RxIC).

According to various embodiments, the display 515 may display a variety of types of display information necessary for the transmission and reception of wireless power.

According to various embodiments, the sensor(s) 514 may include at least some of a current/voltage sensor, a temperature sensor, an illuminance sensor, or a sound sensor. The temperature sensor may measure a temperature of the battery 511e.

According to various embodiments, the processor 512 may identify whether to perform charging control based on the time-dependent change in temperature within the first electronic device 501 (e.g., the electronic device 101 in FIGS. 1 and 4A) or of the battery 511e, which is measured by the temperature sensor.

According to various embodiments, the processor 512 may perform overall control over the first electronic device 501 (e.g., the electronic device 101 in FIGS. 1 and 4A), may generate a variety of types of messages necessary for wireless power transmission, and may transmit the messages to the communication circuit 513.

According to various embodiments, the processor 512 may charge the battery 511e through a charging circuit (e.g., the charging circuit 310 in FIG. 3) by using power received from the second electronic device 502 (e.g., the first external electronic device 103 in FIG. 4A) through the power reception circuit 511. While the battery 511e is charged, the processor 512 may check condition information related to an operation of charging the battery 511e. For example, the condition information related to the operation of charging the battery 511e may include at least one of information related to a fully-charged state of the battery 511e based on the capacity of the battery 511e, information related to whether the battery 511e is abnormal (e.g., a swelling state), or a heating state of the first electronic device 501 (e.g., the electronic device 101 in FIGS. 1 and 4A).

According to various embodiments, the processor 512 may transmit, to the second electronic device 502 (e.g., the first external electronic device 103 in FIG. 4A), a signal corresponding to the stop of power output based on at least condition information related to an operation of charging the battery 511e so that the second electronic device 502 (e.g., the first external electronic device 103 in FIG. 4A) stops an operation of wirelessly outputting power. For example, when it is identified that a state of the first electronic device 501 (e.g., the electronic device 101 in FIGS. 1 and 4A) is at least one of a state in which a temperature of the first electronic device 501 is a designated temperature or more or a fully-charged state, the processor 512 may control to transmit, to the second electronic device 502. (e.g., the first external electronic device 103 in FIG. 4A), a signal corresponding to the stop of power output so that the second electronic device 502 (e.g., the first external electronic device 103 in FIG. 4A) stops an operation of wirelessly outputting power.

According to various embodiments, the processor 512 may control the power reception circuit 511 so that the second electronic device 502 (e.g., the first external electronic device 103 in FIG. 4A) does not receive wirelessly output power or may control at least some (e.g., the communication circuit 513 or the power reception circuit 511) of internal elements of the first electronic device 501 (e.g., the electronic device 101 in FIGS. 1 and 4A) so that the at least some do not respond to a signal received from the second electronic device 502 (e.g., the first external electronic device 103 in FIG. 4A). For example, the processor 512 may be included in the receiver integrated circuit (RxIC), According to various embodiments, the processor 512 may check whether at least one of a signal for charging resumption or a signal related to the detachment state of the second electronic device 502 (e.g., the first external electronic device 103 in FIG. 4A) is detected in the state in which power output of the second electronic device 502 (e.g., the first external electronic device 103 in FIG. 4A) has been stopped. For example, after a given time elapses in the fully-charged state of the battery 511e, when the measured amount of remaining power of the battery 511e is smaller than a predefined value or a measured temperature of the battery 511e is smaller than a predefined value, the processor 512 may identify that the signal for charging resumption has been detected, but the disclosure is not limited thereto.

According to various embodiments, in the state in which power output of the second electronic device 502 (e.g., the first external electronic device 103 in FIG. 4A) has been stopped, the processor 512 may check a state in which power can be received from the second electronic device 502 (e.g., the first external electronic device 103 in FIG. 4A) positioned near the first electronic device 501 (e.g., receive a signal related to a detachment state (e.g., ping)), may identify a charging resumption condition for the battery 511e, and may control to charge the battery 511e through the charging circuit 210 when the charging resumption condition is satisfied (e.g., a measured amount of remaining power of the battery 511e is smaller than a predefined value or a measured temperature of the battery 511e is smaller than a predefined value after a given time elapses).

According to various embodiments, the processor 512 may transmit, to the second electronic device 502 (e.g., the first external electronic device 103 in FIG. 4A), a signal corresponding to the resumption of power output based on at least one of a signal for the charging resumption of the battery 511e or a signal related to the detachment state of the first electronic device 501 (e.g., the electronic device 101 in FIGS. 1 and 4A) from the second electronic device 502 (e.g., the first external electronic device 103 in FIG. 4A) so that the second electronic device 502 (e.g., the first external electronic device 103 in FIG. 4A) resumes an operation of wirelessly outputting power. In an embodiment, in response to the transmission of the signal corresponding to the resumption of the power output, the processor 512 may receive power transmitted by the second electronic device 502 (e.g., the first external electronic device 103 in FIG. 4A).

According to various embodiments, the processor 512 may control to respond to a signal or power of the second electronic device 502 (e.g., the first external electronic device 103 in FIG. 4A) based on at least one of a signal for the charging resumption of the battery 511e or whether the first electronic device 501 (e.g., the electronic device 101 in FIGS. 1 and 4A) is detached from the second electronic device 502 (e.g., the first external electronic device 103 in FIG. 4A) so that the second electronic device 502 (e.g., the first external electronic device 103 in FIG. 4A) resumes an operation of wirelessly outputting power.

According to various embodiments, when the detachment of the second electronic device 502 (e.g., the first external electronic device 103 in FIG. 4A) is detected through the sensing circuit 516, the processor 512 may receive a signal related to a state of the sensing circuit 516 from the power reception circuit 521. For example, the signal related to the state of the sensing circuit 516 may include a signal indicating that a state of the sensing circuit 516 shifts from a low state (e.g., an attached state) to a high state (e.g., a detached state).

According to various embodiments, the processor 512 may transmit, to the power reception circuit 511, a signal corresponding to the deactivation of the power reception circuit 511 based on at least condition information related to an operation of charging the battery 511e. Alternatively, an operation for deactivating the power reception circuit 511 may include an operation for performing control so that a response signal for a confirmation signal for confirming the first electronic device 501 (e.g., the electronic device 101 in FIGS. 1 and 4A), which is received from the second electronic device 502 (e.g., the first external electronic device 103 in FIG. 4A), is not transmitted to the second electronic device 502 (e.g., the first external electronic device 103 in FIG. 4A).

According to various embodiments, the processor 512 may transmit, to the power reception circuit 511, a signal corresponding to the activation of the power reception circuit 511 based on at least a signal for the charging resumption of the battery 511e or a signal related to the detachment state of the second electronic device 502 (e.g., the first external electronic device 103 in FIG. 4A). Alternatively, an operation for activating the power reception circuit 511 may include an operation of transmitting, to the second electronic device 502 (e.g., the first external electronic device 103 in FIG. 4A), a response signal for a power signal received from the second electronic device 502 (e.g., the first external electronic device 103 in FIG. 4A).

According to various embodiments, the second electronic device 502 (e.g., the first external electronic device 103 in FIG. 4A) may include a power transmission circuit 521, a processor 522, a communication circuit 523, a sensing circuit 524 and/or a security module 525.

According to various embodiments, the power transmission circuit 521 may include a power adaptor 521a for receiving a power source (or power) from the outside and properly converting a voltage of input power, a power generation circuit 521b for generating power and/or a matching circuit 521c for maximizing efficiency between the Tx coil 521L and the Rx coil 511L.

According to various embodiments, the power transmission circuit 521 may include a plurality of at least some of the power adaptor 521a, the power generation circuit 521b, the Tx coil 521L, or the matching circuit 521c so that power can be transmitted to a plurality of power reception devices.

According to various embodiments, the power transmission circuit 521 may generate a first signal having a first frequency, for providing first power to the first electronic device 501 (e.g., the electronic device 101 in FIGS. 1 and 4A), and a second signal having a second frequency, for providing second power to the second electronic device 502 (e.g., the first external electronic device 103 in FIG. 4A), by using the power generation circuit 521b.

According to various embodiments, the processor 522 may perform overall control over the second electronic device 502 (e.g., the first external electronic device 103 in FIG. 4A), may generate a variety of types of messages necessary for wireless power transmission, and may transmit the messages to the communication circuit 523.

According to various embodiments, the processor 522 may calculate power (or a power quantity) to be transmitted to the first electronic device 501 (e.g., the electronic device 101 in FIGS. 1 and 4A) based on information received from the communication circuit 523.

According to various embodiments, the processor 522 may control the power transmission circuit 521 to transmit calculated power to the first electronic device 501 (e.g., the electronic device 101 in FIGS. 1 and 4A) through the Tx coil 521L.

According to various embodiments, if power is transmitted to each of a plurality of power reception devices, the processor 522 may control the power generation circuit 521b to generate a first signal having a first frequency, for providing first power to the first external electronic device and a second signal having a second frequency, for providing second power to the second external electronic device.

According to various embodiments, the communication circuit 523 may include at least one of a first communication circuit 523a or a second communication circuit 523b. The first communication circuit 523a may communicate with the first communication circuit 513a of the first electronic device 501 (e.g., the electronic device 101 in FIGS. 1 and 4A) by using a frequency band identical with or neighboring a frequency band used for power transfer in the Tx coil 521L, for example (e.g., an inband method). The first communication circuit 513a may communicate with the first communication circuit 523a by using the Tx coil 521L for transmitting, to the first electronic device 501 (e.g., the electronic device 101 in FIGS. 1 and 4A), power generated by the power generation circuit 521b, for example.

According to various embodiments, the first communication circuit 523a of the second electronic device 502 and the first communication circuit 513a of the first electronic device 501 may communicate with each other using the inband method. The first communication circuit 523a of the second electronic device 502 may communicate with the first electronic device 501 by using the Tx coil 521L for transmitting power to the first electronic device 501 (e.g., the electronic device 101 in FIGS. 1 and 4A). The first communication circuit 513a of the first electronic device 501 may communicate with the second electronic device 502 by using the Rx coil 511L for receiving power from the second electronic device 502 (e.g., the first external electronic device 103 in FIG. 4A). The first electronic device 501 and the second electronic device 502 may communicate with each other using the coils 511L and 521L for power transmission and reception.

According to various embodiments, the second communication circuit 523b may communicate with the second communication circuit 513b of the first electronic device 501 (e.g., the electronic device 101 in FIG. 1) by using a frequency band different from a frequency band used to transmit power in the Tx coil 521L, for example (e.g., an outband method). For example, the second communication circuit 523b may use any one of various short-distance communication methods, such as Bluetooth, Bluetooth low energy (BLE), direct, or near field communication (NFC). The second communication circuit 523b may include an antenna 523c capable of communicating with an external electronic device (e.g., the first electronic device 501). The processor 522 may obtain, from the communication circuit 523, 523a, or 523b, information e.g., Vrec information, tout information, or a variety of types of packets and/or messages) related to a charging state. The processor 522 may regulate power supplied to the first electronic device 501 (e.g., the electronic device 101 in FIGS. 1 and 4A) based on the information related to the charging state.

According to various embodiments, when transmitting data through the second communication circuit 523b, the security module 525 encrypts the data.

According to various embodiments, when transmitting data through the second communication circuit 523b, the security module 525 may be used to encrypt the data.

According to various embodiments, the security module 525 may be connected to the processor 522 and/or the second communication circuit 523b, and may transmit and receive data. The security module 525 may perform an authentication procedure or use data stored therein, while transmitting and receiving data to and from the processor 522 and/or the second communication circuit 523b.

According to various embodiments, the security module 525 may be included in the processor 522 and implemented as an integrated circuit.

According to various embodiments, when transmitting data through the second communication circuit 523b, the processor 522 enables the data to be encrypted.

According to various embodiments, the processor 522 may be connected to the second communication circuit 523b, and may transmit and receive data. The processor 522 may perform an authentication procedure or use data stored in the security module 525, while transmitting and receiving data to and from the second communication circuit 523b.

The second electronic device 502 (e.g., the electronic device 103 in FIG. 4A) may further include a policy manager (not illustrated) related to a communication method or a charging policy of the second communication circuit 523b.

In various embodiments, the policy manager may identify a power state (e.g., a voltage, a current and/or power) of the first electronic device 501 (e.g., the electronic device 101 in FIGS. 1 and 4A) connected to the second electronic device 502 for communication through the first communication circuit 523a or the second communication circuit 523b, and may change a power state for charging when the authentication of the first electronic device 501 (e.g., the electronic device 101 in FIG. 1) is completed.

In various embodiments, the processor 522 may identify a power state (e.g., a voltage, a current and/or power) of the first electronic device 501 (e.g., the electronic device 101 in FIGS. 1 and 4A) connected to the second electronic device 502 for communication through the first communication circuit 523*a* or the second communication circuit 523*b*, and may change a power state for charging when the authentication of the first electronic device 501 (e.g., the electronic device 101 in FIGS. 1 and 4A) is completed.

According to various embodiments, the sensing circuit 524 may include at least one sensor, and may detect at least one state of the second electronic device 502 (e.g., the first external electronic device 103 in FIG. 4A) by using the at least one sensor.

According to various embodiments, the sensing circuit 524 may include at least one of a temperature sensor, a motion sensor, or a current (or voltage) sensor, may detect a temperature state of the second electronic device 502 (e.g., the first external electronic device 103 in FIG. 4A) by using the temperature sensor, may detect a motion state of the second electronic device 502 (e.g., the first external electronic device 103 in FIG. 4A) by using the motion sensor, and may detect a state of an output signal of the second electronic device 502 (e.g., the first external electronic device 103 in FIG. 4A), for example, a current magnitude, a voltage magnitude or a power magnitude by using the current (or voltage) sensor.

According to various embodiments, the current (or voltage) sensor may measure a signal in the power transmission circuit 521, and may measure a signal in at least some region of the coil 521L, the matching circuit 521*c* or the power generation circuit 521*b*. For example, the current (or voltage) sensor may include a circuit for measuring a signal in a front stage of the coil 521L.

According to various embodiments, the sensing circuit 524 may be a circuit for foreign object detection (FOD).

According to various embodiments, the processor 522 may transmit power for charging the battery 511*e* to the first electronic device 501 (e.g., the electronic device 101 in FIGS. 1 and 4A).

According to various embodiments, when receiving a signal corresponding to the stop of power output from the first electronic device 501 (e.g., the electronic device 101 in FIGS. 1 and 4A), the processor 522 may stop an operation of outputting power based on at least condition information related to an operation of charging the battery 511*e* so that the operation of wirelessly outputting power is stopped.

According to various embodiments, the processor 522 may receive, from the first electronic device 501 (e.g., the electronic device 101 in FIGS. 1 and 4A), a signal corresponding to the resumption of power output so that an operation of wirelessly outputting power is resumed. In response to the reception of the signal corresponding to the resumption of the power output, the processor 522 may wirelessly transmit output power to the first electronic device 501 (e.g., the electronic device 101 in FIGS. 1 and 4A).

Figure 6A:
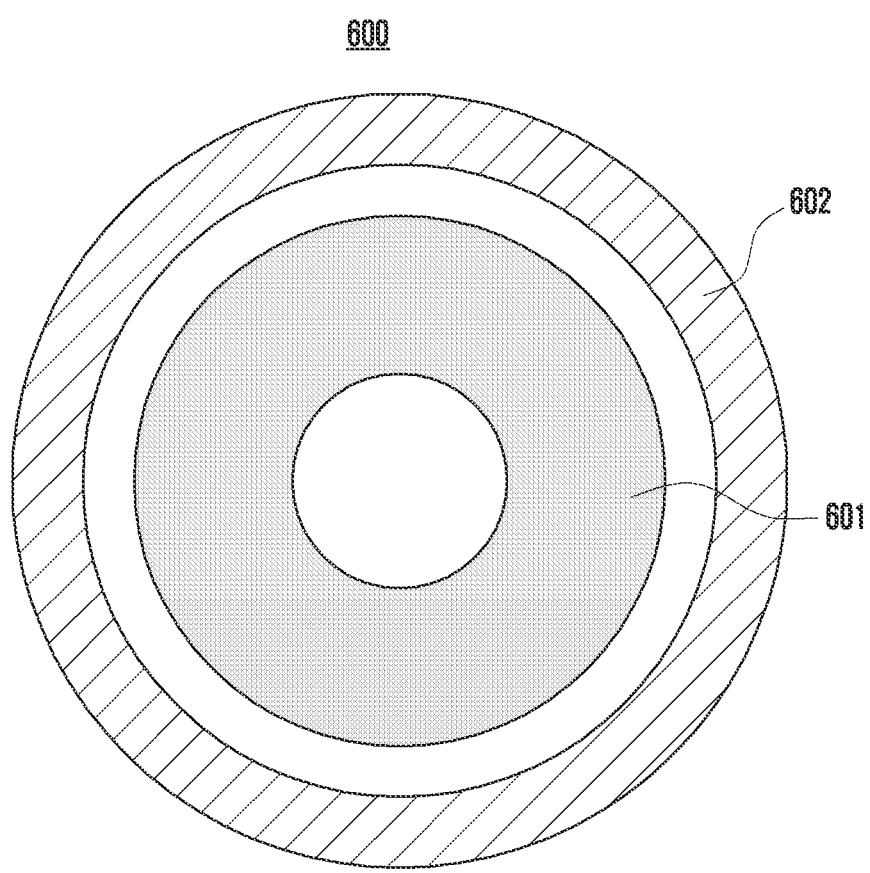
FIG. 6A is a diagram illustrating a coil included in an electronic device, a first external electronic device and/or a second external electronic device according to an embodiment of the disclosure.

FIG. 6A is a diagram illustrating a coil included in an electronic device, a first external electronic device and/or a second external electronic device according to an embodiment of the disclosure.

Figure 6B:
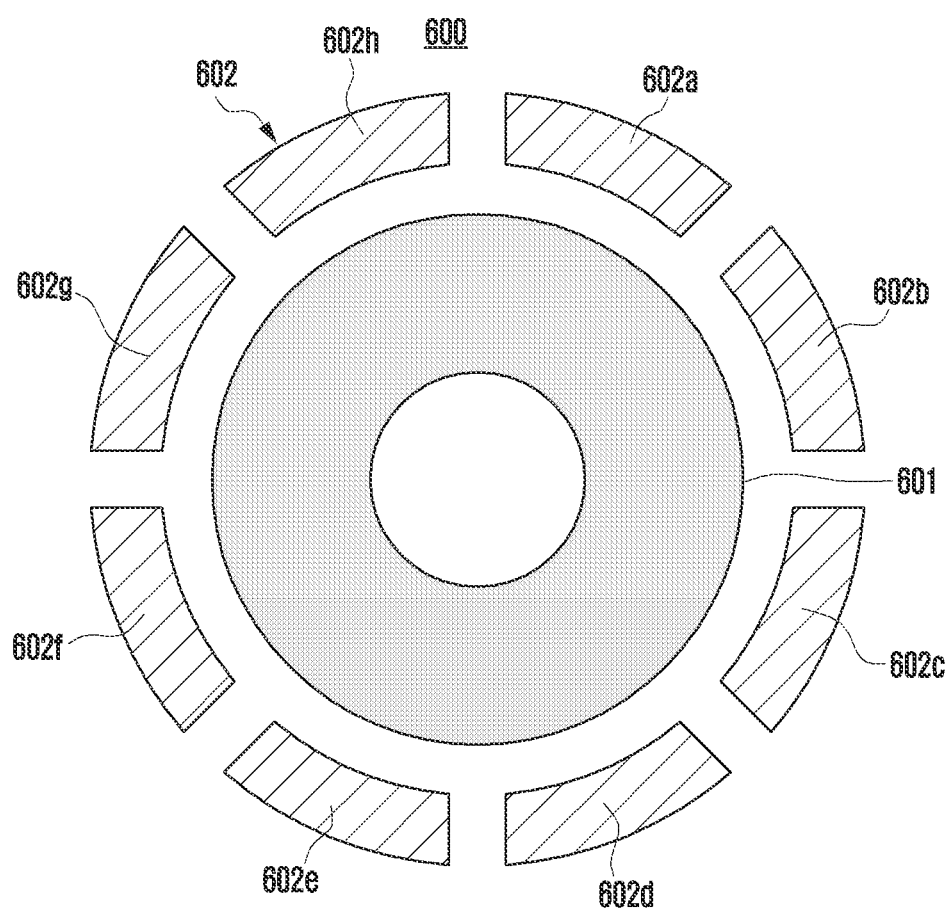
FIG. 6B is a diagram illustrating a coil included in an electronic device, a first external electronic device and/or a second external electronic device according to an embodiment of the disclosure.

FIG. 6B is a diagram illustrating a coil included in an electronic device, a first external electronic device and/or a second external electronic device according to an embodiment of the disclosure.

Figure 7:
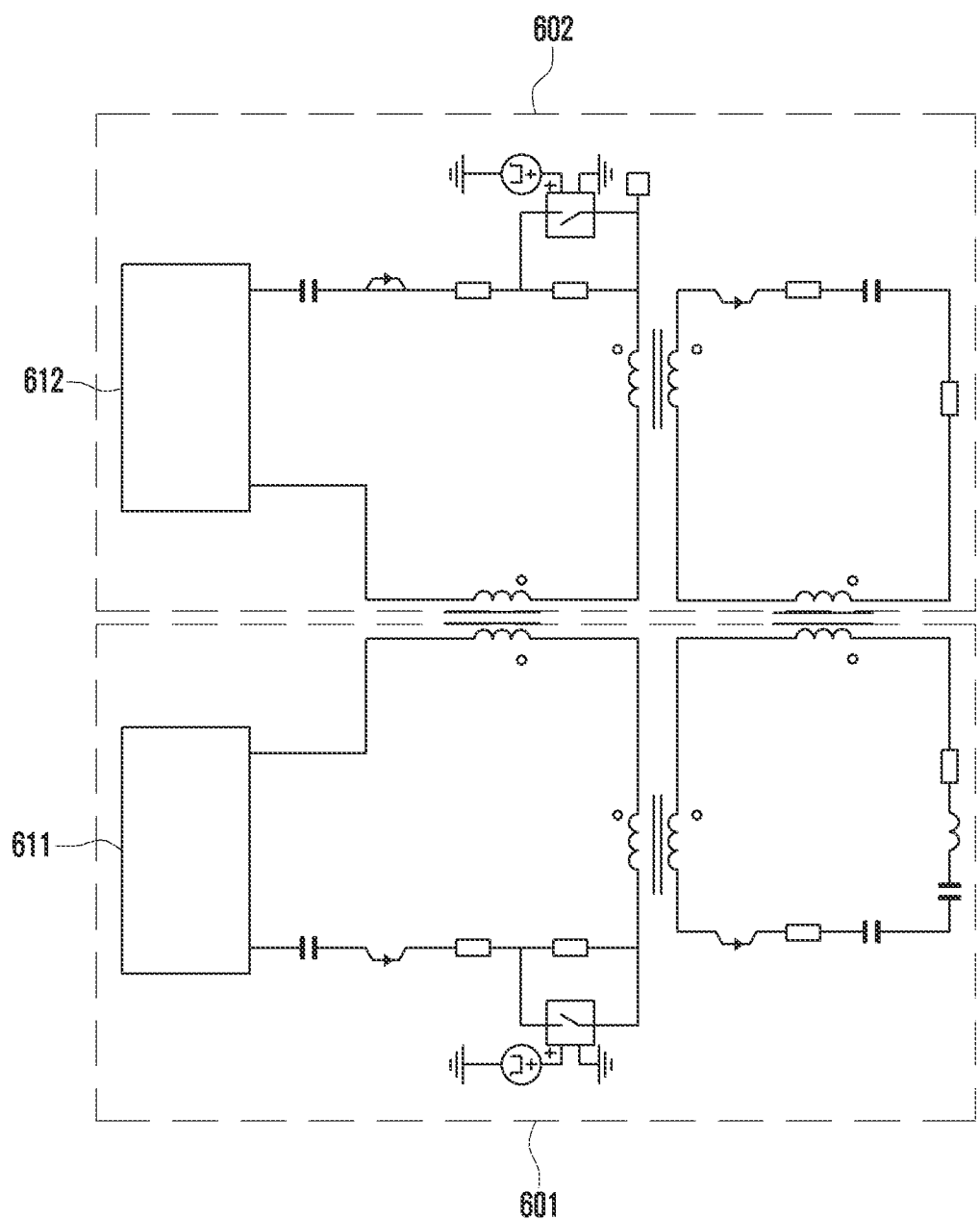
FIG. 7 is a diagram illustrating an equivalent circuit of the coil according to an embodiment of the disclosure.

FIG. 7 is a diagram illustrating an equivalent circuit of a coil according to an embodiment of the disclosure.

A coil 600 may be identical with or similar to the coil 511L in FIG. 5A and the coil 521L in FIG. 5B. Referring to FIGS. 6A, 6B, and 7, the coil 600 may include a WPT coil 601 and a sensor coil 602. The sensor coil 602 may surround the WPT coil 601. The WPT coil 601 may be a coil for transmitting and receiving power to and from an external electronic device. The sensor coil 602 may be a coil for detecting a foreign object when power is transmitted to and received from an external electronic device.

The sensor coil 602 in FIG. 6A and the sensor coil 602 in FIG. 6B are different in a coil winding method (or a wiring method) and may be substantially the same. The sensor coil 602 in FIG. 6A may be a planar loop type coil that surrounds the periphery of the WPT coil 601 on a plane. The sensor coil 602 in FIG. 6A may have a greater coil radius than the WPT coil 601.

The sensor coil 602 in FIG. 6B may surround the periphery of the WPT coil 601 on a plane, and may include a plurality of coils 602*a*, 602*b*, 602*c*, 602*d*, 602*e*, 602*f*, 602*g*, and 602*h*. The plurality of coils 602*a*, 602*b*, 602*c*, 602*d*, 602*e*, 602*f*, 602*g*, and 602*h* may be isolated from one another, and may surround the periphery of the WPT coil 601 on a plane.

When transmitting wireless power, the WPT coil 601 may transmit the power applied through a first inverter 611.

When receiving wireless power, the WPT coil 601 may convert the received power through the first inverter 611, and may supply the power to the electronic device 101, the first external electronic device 103 and/or the second external electronic device 105.

The sensor coil 602 may transmit and receive power, may transfer information or may detect a foreign object based on power received through a second inverter 612.

The electronic device 101, the first external electronic device 103 and/or the second external electronic device 105 may measure a waveform of a current or voltage input to and output from the WPT coil 601 and/or the sensor coil 602 under the control of the processor 120.

The sensor coil 602 may be disposed around the WPT coil 601, for example, and may perform communication or transmit and receive power by using a frequency band higher than a frequency band of the WPT coil 601.

When receiving power through the WTP coil 601, the sensor coil 602 may transmit a message (e.g., a power transmission message or a power transmission stop request message) defined in the wireless power consortium (WPC).

Figure 8A:
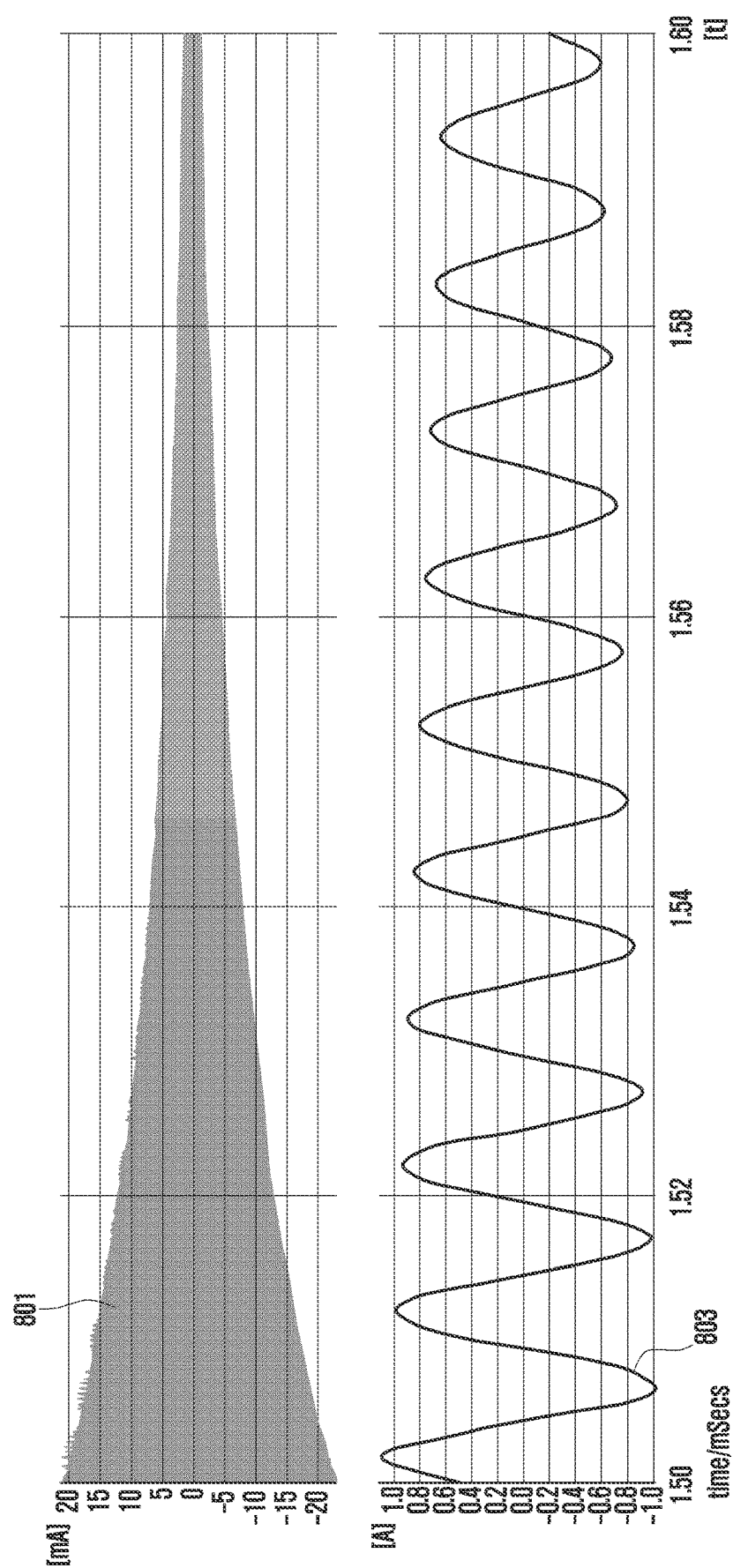
FIG. 8A is a graph illustrating a quality factor (Q factor) of the coil when a foreign object is not present in a wireless charging operation according to an embodiment of the disclosure.
Figure 8B:
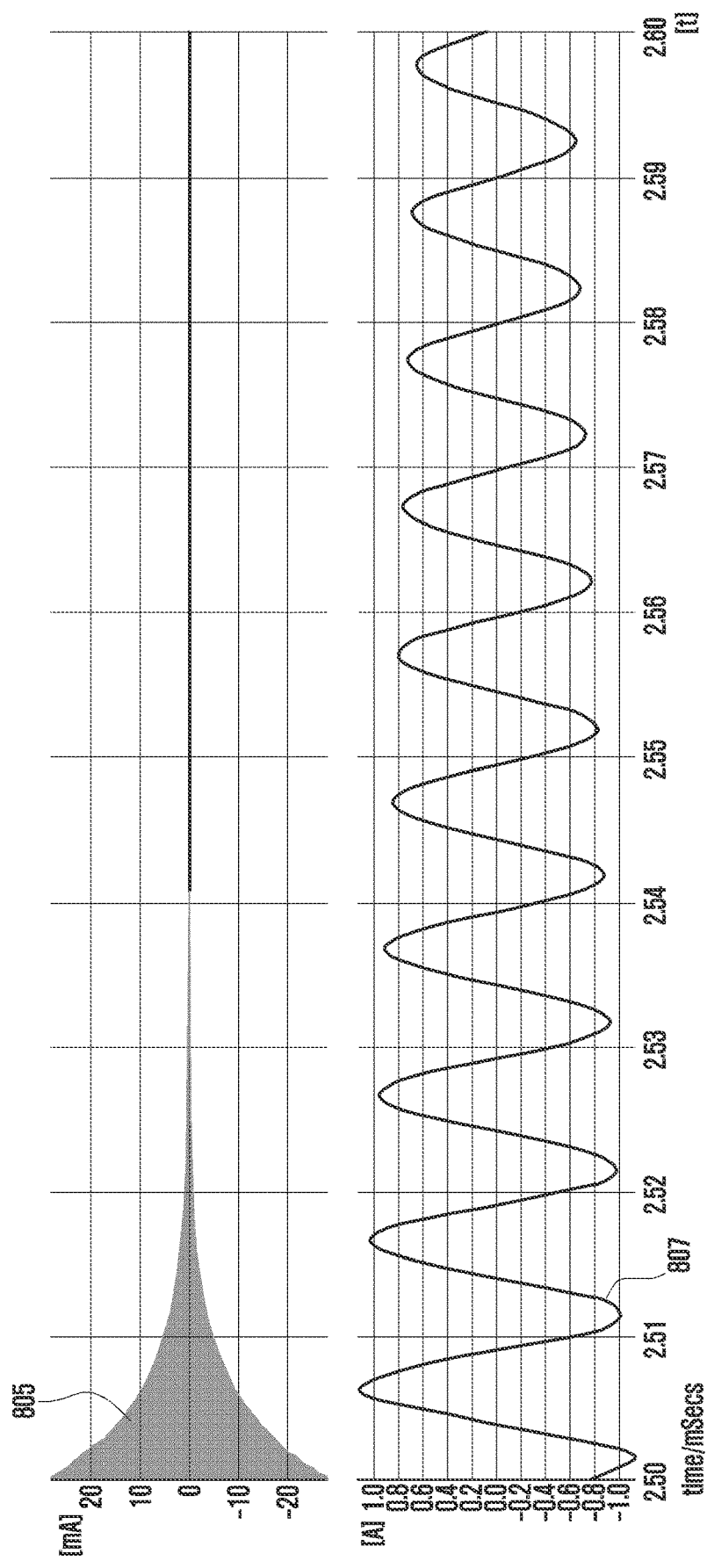
FIG. 8B is a graph illustrating a Q factor of the coil when a foreign object is present in a wireless charging operation according to an embodiment of the disclosure.

Referring to FIG. 8B, when a foreign object is present during power transmission, a Q factor of the sensor coil 602 may suddenly change. The foreign object may be detected based on a characteristic of the sensor coil 602. A resonant frequency of the sensor coil 602 may be formed in a higher frequency compared to the WPT coil 601. A characteristic of the resonant frequency of the sensor coil 602 may be formed to be sharper compared to a characteristic of the resonant frequency of the WPT coil 601. A band of the resonant frequency of the sensor coil 602 may be narrower than a band of the resonant frequency of the WPT coil 601.

The band of the resonant frequency of the sensor coil 602 is narrower than the band of the resonant frequency of the WPT coil 601. Accordingly, if a foreign object is present in a resonant path, a Q factor of the sensor coil 602 may suddenly change because impedance of the sensor coil 602 suddenly changes.

FIG. 8A is a graph illustrating a Q factor of a coil when a foreign object is not present in a wireless charging operation according to an embodiment of the disclosure.

FIG. 8B is a graph illustrating a Q factor of a coil when a foreign object is present in a wireless charging operation according to an embodiment of the disclosure.

A coil, such as an inductor, may store on-energy from the outside. However, the stored energy is extinct over time due to a resistance component of the coil itself. A concept introduced to define a degree of a loss generated at this time is a Q factor.

The Q factor is defined by reactance/resistance. In this case, the reactance is a resistance component attributable to inductance of the coil. The resistance means an Ohmic resistance component. That is, the Q factor is a value that means a kind of quality. The following two values are commonly used as a value actually called a Q factor.

First, in the case of an inductor, a value is defined as a ratio of an imaginary part/real part. If energy is accumulated as a magnetic field, the value may indicate a degree of a loss. In this case, although a circuit other than an inductor is used, the value is also represented as a Q value of the circuit, and definition thereof is the same. In such a case, the Q value is also divided into loaded Q and unloaded Q.

Second, if energy is sharply formed in a specific frequency spectrum as in a bandpass filter (BPF), a resonator, or an oscillator, even when a degree of concentration of energy in a corresponding waveform is represented, an index called a Q factor may be used. In this case, the Q factor is defined by a center frequency/3 dB bandwidth.

In this case, the 3 dB bandwidth means a frequency bandwidth in which energy drops to both sides by 3 dB from the highest frequency, that is, a point at which the energy becomes ½. That is, when a Q value is high, this means that energy is sharply concentrated.

Accordingly, as the Q factor is increased, a loss 1Loss is decreased. Furthermore, the two meanings may look as if they are quite different, but have the same meaning. This may be verified through the existing equation.

Graphs 801 in FIG. 8A and 805 in FIG. 8B may indicate Q factors of the sensor coil 602. Graphs 803 in FIG. 8A and 807 in FIG. 8B may indicate a change in the Q factor of the WPT coil 601.

Referring to FIGS. 8A and 8B, a change in the Q factor of the sensor coil 602 depending on whether a foreign object is present or not during the transmission and reception of wireless power may be greater than a change in the Q factor of the WPC coil 601. For example, a resonant frequency of the WPC coil 601 may be 100 kHz. In this case, if a foreign object is not present during the transmission and reception of wireless power, the Q factor of the WPC coil 601 may be 10. If a foreign object is present during the transmission and reception of wireless power, the Q factor of the WPC coil 601 may be 5.

For example, a resonant frequency of the sensor coil 602 may be 13.56 MHz. In this case, if a foreign object is not present during the transmission and reception of wireless power, a Q factor of the sensor coil 602 may be 1420. If a foreign object is present during the transmission and reception of wireless power, a Q factor of the sensor coil 602 may be 141.

Figure 9:
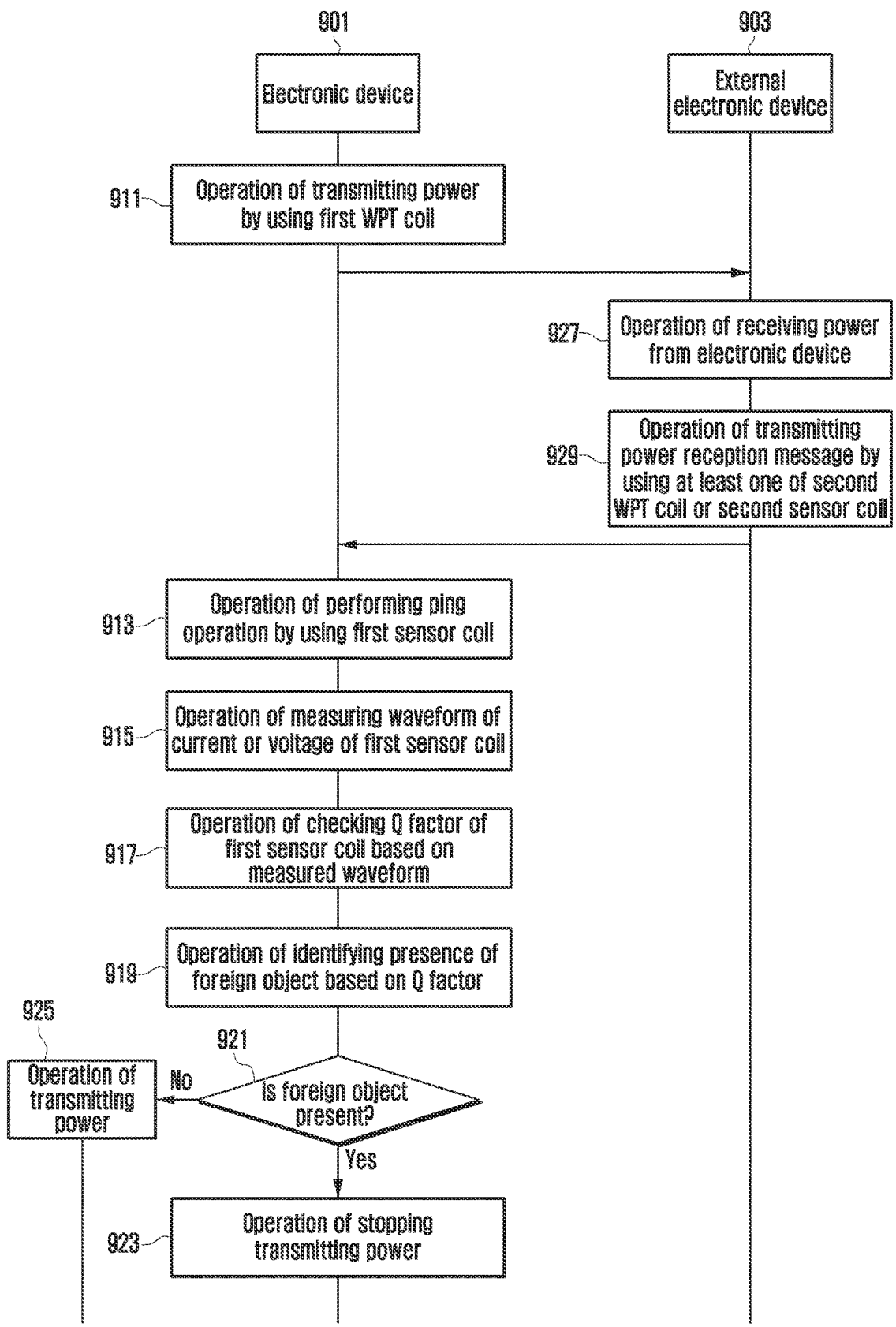
FIG. 9 is a flowchart illustrating a method of detecting a foreign object using a sensor coil between an electronic device and an external electronic device according to an embodiment of the disclosure.

FIG. 9 is a flowchart illustrating a method of detecting a foreign object using a sensor coil between an electronic device and an external electronic device according to an embodiment of the disclosure.

Referring to FIG. 9, an electronic device 901 according to various embodiments is an electronic device capable of wirelessly transmitting and receiving power. The electronic device 901 may wirelessly transmit power to an external electronic device 903. The electronic device 901 may be a wireless power transmission device, for example.

The external electronic device 903 according to various embodiments is an electronic device capable of wirelessly transmitting and receiving power. The external electronic device 903 may wirelessly receive power from the electronic device 901. The external electronic device 903 may be a wireless power reception device, for example.

In various embodiments, the electronic device 901 and the external electronic device 903 may include elements (e.g., the processor 120 and the memory 130) of the electronic device 101 in FIG. 1.

In various embodiments, the electronic device 901 is a wireless power transmission device, and may include elements of the second electronic device 502 in FIG. 5B.

In various embodiments, the external electronic device 903 is a wireless power reception device, and may include elements of the first electronic device 501 in FIG. 5A.

In various embodiments, the electronic device 901 may include the WPT coil 601 and the sensor coil 602 described with reference to FIGS. 6A, 6B, and 7. In an embodiment, the electronic device 901 may include the WPT coil 601 except the sensor coil 602 described with reference to FIGS. 6A, 6B, and 7.

In various embodiments, the external electronic device 903 may include the WPT coil 601 and the sensor coil 602 described with reference to FIGS. 6A, 6B, and 7. In an embodiment, the external electronic device 903 may include the WPT coil 601 except the sensor coil 602 described with reference to FIGS. 6A, 6B, and 7.

In various embodiments, at operation 911, the electronic device 901 may transmit power by using the first WPT coil under the control of the processor 120 (e.g., the processor 522 in FIG. 5B).

When a wireless charging operation between the electronic device 901 and the external electronic device 903 is started, the electronic device 901 may transmit power by using the first WPT coil under the control of the processor 120 (e.g., the processor 522 in FIG. 5B).

The first WPT coil may be the WPT coil 601 included in the electronic device 901. The first sensor coil may be the sensor coil 602 included in the electronic device 901.

The second WPT coil may be the WPT coil 601 included in the external electronic device 903. The second sensor coil may be the sensor coil 602 included in the external electronic device 903.

In various embodiments, at operation 927, the external electronic device 903 may receive the power from the electronic device 901 by using the second WPT coil under the control of the processor 120 (e.g., the processor 512 in FIG. 5A).

In various embodiments, when receiving the power from the electronic device 901, the external electronic device 903 may transmit a power reception message to the electronic device 901 by using at least one of the second WPT coil or the second sensor coil under the control of the processor 120 (e.g., the processor 512 in FIG. 5A) at operation 929.

In various embodiments, if the external electronic device 903 does not include the second sensor coil, the external electronic device 903 may transmit the power reception message to the electronic device 901 by using the second WPT coil. If the external electronic device 903 transmits the power reception message to the electronic device 901 by using the second WPT coil, although the electronic device 901 includes both the first WPT coil and the first sensor coil, the electronic device 901 may receive the power reception message by using the first WPT coil.

In various embodiments, the electronic device 901 may include the first WPT coil and the first sensor coil. The external electronic device 903 may include the second WPT coil and the second sensor coil. The external electronic device 903 may transmit the power reception message to the electronic device 901 by using at least one of the second WPT coil or the second sensor coil. For example, if the external electronic device 903 transmits the power reception message to the electronic device 901 by using at least one of the second WPT coil or the second sensor coil, the electronic device 901 may receive the power reception message by using at least one of the first WPT coil or the first sensor coil. When the external electronic device 903 transmits the power reception message to the electronic device 901 by using the second WPT coil, the electronic device 901 may receive the power reception message by using the first WPT coil not the first sensor coil. When the external electronic device 903 transmits the power reception message to the electronic device 901 by using the second sensor coil, the electronic device 901 may receive the power reception message by using the first sensor coil not the first WPT coil.

In various embodiments, the power reception message may include information on a Q factor of the second sensor coil included in the external electronic device 903. The information on the Q factor of the second sensor coil included in the external electronic device 903 may include information on a decrease in the Q factor of the second sensor coil attributable to the electronic device 901 when a foreign object is not present, for example. In various embodiments, the information on the Q factor of the second sensor coil included in the external electronic device 903 may include a threshold value of the Q factor which is a criterion for identifying a foreign object, as a predetermined value of the Q factor of the second sensor coil, for example.

In various embodiments, when the external electronic device 903 receives the power from the electronic device 901, operation 929 of transmitting the power reception message to the electronic device 901 by using at least one of the second WPT coil or the second sensor coil may be omitted. The power reception message may be a message that provides notification that the external electronic device 903 receives power from the electronic device 901.

In various embodiments, at operation 913, the electronic device 901 may perform a ping operation by using the first sensor coil under the control of the processor 120 (e.g., the processor 522 in FIG. 5B).

In various embodiments, at operation 913, the electronic device 901 may apply a resonant frequency current to the first sensor coil under the control of the processor 120 (e.g., the processor 522 in FIG. 5B). At this time, the electronic device 901 may stop a current being input to the first sensor coil and apply the resonant frequency current to the first sensor coil.

In various embodiments, at operation 913, the electronic device 901 may periodically perform the ping operation by using the first sensor coil while transmitting the power to the external electronic device 903 under the control of the processor 120 (e.g., the processor 522 in FIG. 5B).

In various embodiments, at operation 913, the electronic device 901 may receive the power reception message and perform the ping operation on a one-off basis by using the first sensor coil under the control of the processor 120 (e.g., the processor 522 in FIG. 5B).

In various embodiments, at operation 915, the electronic device 901 may measure a waveform of a current or voltage of the first sensor coil under the control of the processor 120 (e.g., the processor 522 in FIG. 5B).

For example, after a current being input to the first sensor coil is stopped, while a resonant frequency current (e.g., AC) is applied to the first sensor coil, at operation 915, the electronic device 901 may measure an attenuation curve of the resonant frequency current applied to the first sensor coil or a voltage envelope of the sensor coil under the control of the processor 120 (e.g., the processor 522 in FIG. 5B).

In various embodiments, at operation 917, the electronic device 901 may check a Q factor of the first sensor coil based on the measured waveform under the control of the processor 120 (e.g., the processor 522 in FIG. 5B).

In various embodiments, at operation 919, the electronic device 901 may identify the presence of a foreign object between the electronic device 901 and the external electronic device 903 (e.g., between the first WPT coil of the electronic device and the second WPT coil of the external electronic device) based on the checked Q factor under the control of the processor 120 (e.g., the processor 522 in FIG. 5B).

In various embodiments, the operation of identifying, by the electronic device 901, the presence of a foreign object based on the checked Q factor at operation 919 may include identifying the presence of a foreign object based on a threshold value of a Q factor of the first sensor coil included in the electronic device 901 and the checked Q factor of the first sensor coil.

For example, when a value of the checked Q factor of the first sensor coil is smaller than the threshold value of the Q factor of the first sensor coil, the electronic device 901 may identify that a foreign object is present under the control of the processor 120 (e.g., the processor 522 in FIG. 5B).

For example, when a value of the checked Q factor of the first sensor coil is greater than the threshold value of the Q factor of the first sensor coil, the electronic device 901 may identify that a foreign object is not present under the control of the processor 120 (e.g., the processor 522 in FIG. 5B).

In various embodiments, at operation 921, the electronic device 901 may identify whether a foreign object is present between the electronic device 901 and the external electronic device 903 during the transmission and reception of wireless power based on the Q factor of the first sensor coil under the control of the processor 120 (e.g., the processor 522 in FIG. 5B).

In various embodiments, at operation 921, the electronic device 901 may identify whether a foreign object is present between the electronic device 901 and the external electronic device 903 during the transmission and reception of wireless power based on operation 919 under the control of the processor 120 (e.g., the processor 522 in FIG. 5B).

In various embodiments, when it is identified that a foreign object is present at operation 921, the electronic device 901 may branch to operation 923 under the control of the processor 120 (e.g., the processor 522 in FIG. 5B).

In various embodiments, when it is identified that a foreign object is not present at operation 921, the electronic device 901 may branch to operation 925 under the control of the processor 120 (e.g., the processor 522 in FIG. 5B).

In various embodiments, when it is identified that a foreign object is present, at operation 923, the electronic device 901 may stop transmitting the power using the first WPT coil under the control of the processor 120 (e.g., the processor 522 in FIG. 5B).

In various embodiments, when it is identified that a foreign object is not present, at operation 925, the electronic device 901 may continue to transmit the power using the first WPT coil under the control of the processor 120 (e.g., the processor 522 in FIG. 5B).

Figure 10:
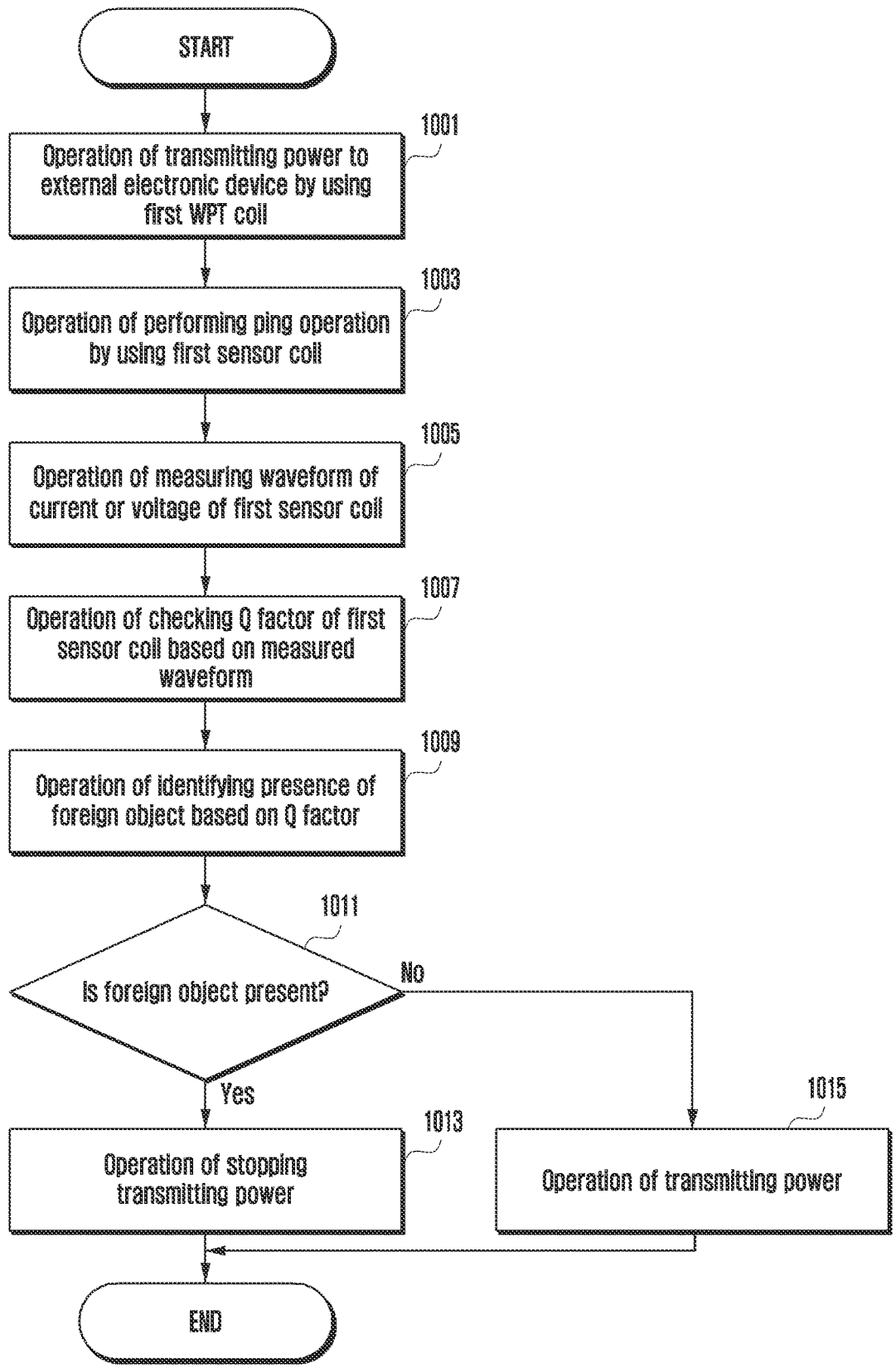
FIG. 10 is a flowchart illustrating a method of detecting a foreign object using a first sensor coil of an electronic device according to an embodiment of the disclosure.

FIG. 10 is a flowchart illustrating a method of detecting, by an electronic device, a foreign object using a first sensor coil according to an embodiment of the disclosure.

Referring to FIG. 10, the electronic device 901 is the same as the electronic device 901 in FIG. 9. The external electronic device 903 in FIG. 10 is the same as the external electronic device 903 in FIG. 9.

In various embodiments, at operation 1001, the electronic device 901 may transmit power by using the first WPT coil under the control of the processor 120 (e.g the processor 522 in FIG. 5B).

When a wireless charging operation between the electronic device 901 and the external electronic device 903 is started, the electronic device 901 may transmit power by using the first WPT coil under the control of the processor 120 (e.g., the processor 522 in FIG. 5B).

In various embodiments, at operation 1003, the electronic device 901 may perform a ping operation by using the first sensor coil under the control of the processor 120 (e.g., the processor 522 in FIG. 5B). For example, the electronic device 910 may perform a ping operation by using the first sensor coil while transmitting power to the external electronic device 903 by using the first WPT coil.

In various embodiments, at operation 1003, the electronic device 901 may apply a resonant frequency current to the first sensor coil under the control of the processor 120 (e.g., the processor 522 in FIG. 5B). At this time, the electronic device 901 may stop a current being input to the first sensor coil and apply the resonant frequency current to the first sensor coil.

In various embodiments, at operation 1003, the electronic device 901 may periodically perform the ping operation by using the first sensor coil while transmitting the power to the external electronic device 903 under the control of the processor 120 (e.g., the processor 522 in FIG. 5B).

In various embodiments, at operation 1003, the electronic device 901 may receive a power reception message and perform the ping operation on a one-off basis by using the first sensor coil under the control of the processor 120 (e.g., the processor 522 in FIG. 5B).

In various embodiments, at operation 1005, the electronic device 901 may measure a waveform of a current or voltage of the first sensor coil under the control of the processor 120 (e.g., the processor 522 in FIG. 5B).

For example, at operation 1005, after a current being input to the first sensor coil is stopped, while a resonant frequency current (e.g., AC) is applied to the first sensor coil, the electronic device 901 may measure an attenuation curve of the resonant frequency current applied to the first sensor coil or a voltage envelope of the sensor coil under the control of the processor 120 (e.g., the processor 522 in FIG. 5B).

In various embodiments, at operation 1007, the electronic device 901 may check a Q factor of the first sensor coil based on the measured waveform under the control of the processor 120 (e.g., the processor 522 in FIG. 5B).

In various embodiments, at operation 1009, the electronic device 901 may identify the presence of a foreign object between the electronic device 901 and the external electronic device 903 (e.g., between the first WPT coil of the electronic device and the second WPT coil of the external electronic device) based on the checked Q factor under the control of the processor 120 (e.g., the processor 522 in FIG. 5B).

In various embodiments, the operation of identifying, by the electronic device 901, the presence of a foreign object based on the checked Q factor at operation 1009 may include identifying the presence of a foreign object based on a threshold value of a Q factor of the first sensor coil included in the electronic device 901 and the checked Q factor of the first sensor coil.

For example, when a value of the checked Q factor of the first sensor coil is smaller than the threshold value of the Q factor of the first sensor coil, the electronic device 901 may identify that a foreign object is present under the control of the processor 120 (e.g., the processor 522 in FIG. 5B).

For example, when a value of the checked Q factor of the first sensor coil is greater than the threshold value of the Q factor of the first sensor coil, the electronic device 901 may identify that a foreign object is not present under the control of the processor 120 (e.g., the processor 522 in FIG. 5B).

In various embodiments, at operation 1011, the electronic device 901 may identify whether a foreign object is present between the electronic device 901 and the external electronic device 903 during the transmission and reception of wireless power based on the Q factor of the first sensor coil under the control of the processor 120 (e.g., the processor 522 in FIG. 5B).

In various embodiments, at operation 1011, the electronic device 901 may identify whether a foreign object is present between the electronic device 901 and the external electronic device 903 during the transmission and reception of wireless power based on operation 1009 under the control of the processor 120 (e.g., the processor 522 in FIG. 5B).

In various embodiments, when it is identified that a foreign object is present at operation 1011, the electronic device 901 may branch to operation 1013 under the control of the processor 120 (e.g., the processor 522 in FIG. 5B).

In various embodiments, when it is identified that a foreign object is not present at operation 1011, the electronic device 901 may branch to operation 1015 under the control of the processor 120 (e.g., the processor 522 in FIG. 5B).

In various embodiments, when it is identified that a foreign object is present, at operation 1013, the electronic device 901 may stop transmitting the power using the first WPT coil under the control of the processor 120 (e.g., the processor 522 in FIG. 5B).

In various embodiments, when it is identified that a foreign object is not present, at operation 1015, the electronic device 901 may continue to transmit the power using the first WPT coil under the control of the processor 120 (e.g., the processor 522 in FIG. 5B).

Figure 11:
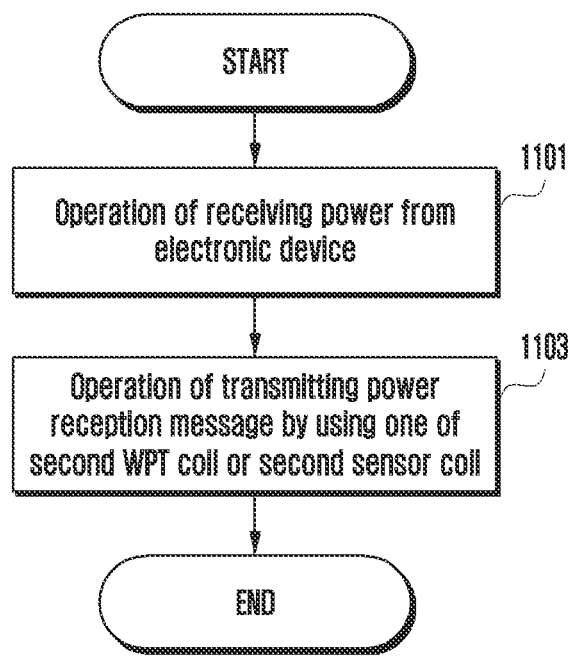
FIG. 11 is a flowchart illustrating a method of detecting a foreign object using a second sensor coil of an external electronic device according to an embodiment of the disclosure.

FIG. 11 is a flowchart illustrating a method of detecting, by an external electronic device, a foreign object using a second sensor coil according to an embodiment of the disclosure.

Referring to FIG. 11, the electronic device 901 is the same as the electronic device 901 in FIG. 9. The external electronic device 903 in FIG. 11 is the same as the external electronic device 903 in FIG. 9.

In various embodiments, at operation 1101, the external electronic device 903 may receive power from the electronic device 901 by using the second WPT coil under the control of the processor 120 (e.g., the processor 512 in FIG. 5A).

In various embodiments, when receiving the power from the electronic device 901, the external electronic device 903 may transmit a power reception message to the electronic device 901 by using at least one of the second WPT coil or the second sensor coil under the control of the processor 120 (e.g., the processor 512 in FIG. 5A) at operation 1103.

Figure 12:
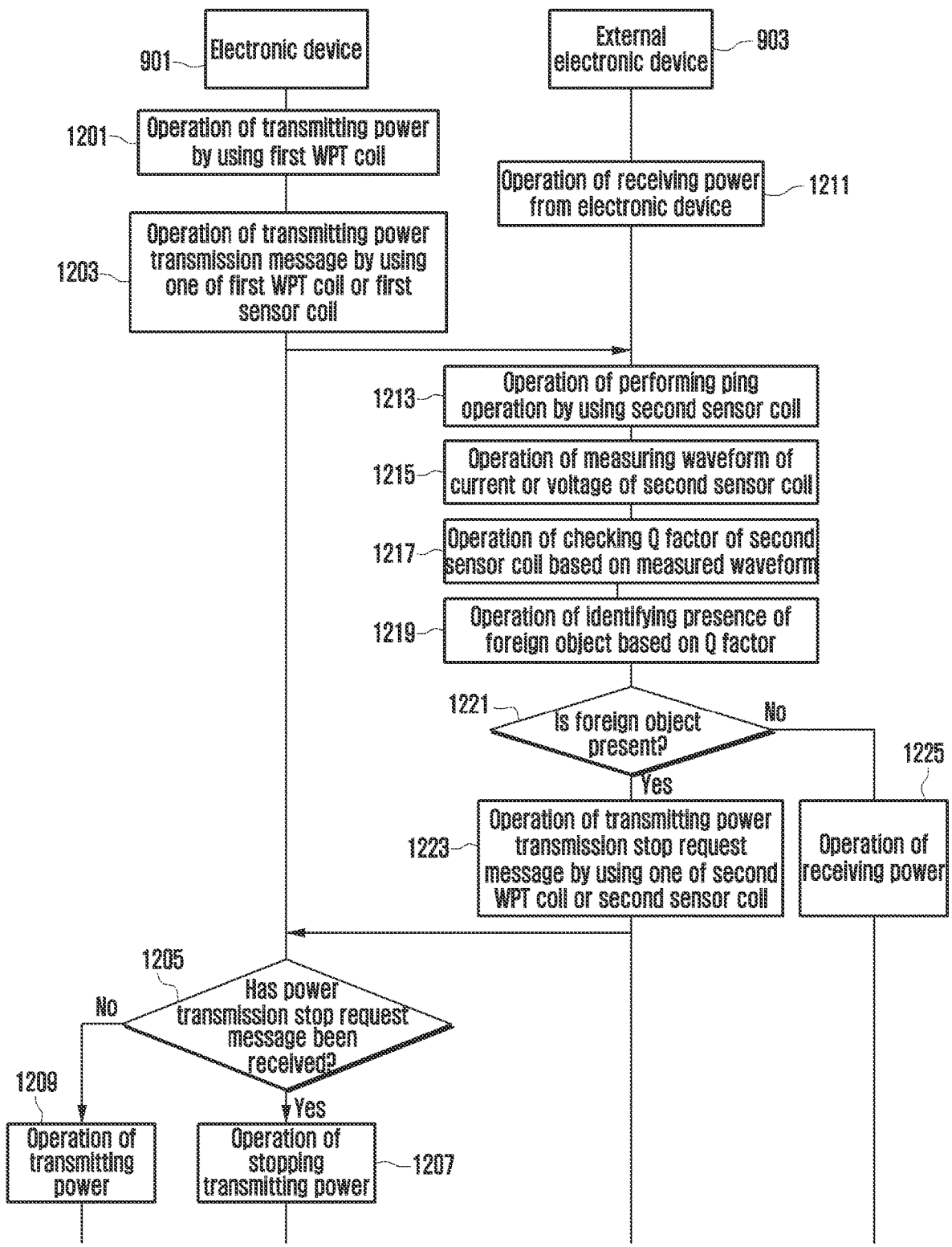
FIG. 12 is a flowchart illustrating a method of detecting a foreign object using a sensor coil between an electronic device and an external electronic device according to an embodiment of the disclosure.

FIG. 12 is a flowchart illustrating a method of detecting a foreign object using a sensor coil between an electronic device and an external electronic device according to an embodiment of the disclosure.

Referring to FIG. 12, the electronic device 901 according to various embodiments is an electronic device capable of wirelessly transmitting and receiving power. The electronic device 901 may wirelessly transmit power to the external electronic device 903. The electronic device 901 may be a wireless power transmission device, for example.

The external electronic device 903 according to various embodiments is an electronic device capable of wirelessly transmitting and receiving power. The external electronic device 903 may wirelessly receive power from the electronic device 901. The external electronic device 903 may be a wireless power reception device, for example.

In various embodiments, the electronic device 901 and the external electronic device 903 may include elements (e.g., the processor 120 and the memory 130) of the electronic device 101 in FIG. 1.

In various embodiments, the electronic device 901 is a wireless power transmission device, and may include elements of the second electronic device 502 in FIG. 5B.

In various embodiments, the external electronic device 903 is a wireless power reception device, and may include elements of the first electronic device 501 in FIG. 5A.

In various embodiments, the electronic device 901 may include the WPT coil 601 and the sensor coil 602 described with reference to FIGS. 6A, 6B, and 7. In an embodiment, the electronic device 901 may include the WPT coil 601 except the sensor coil 602 described with reference to FIGS. 6A, 6B, and 7.

In various embodiments, the external electronic device 903 may include the WPT coil 601 and the sensor coil 602 described with reference to FIGS. 6A, 6B, and 7. In an embodiment, the external electronic device 903 may transmit a message (e.g., a power transmission message or a power transmission stop request message) by using the WPT coil 601 in addition to the sensor coil 602 described with reference to FIGS. 6A, 6B, and 7.

In various embodiments, at operation 1201, the electronic device 901 may transmit power by using the first WPT coil under the control of the processor 120 (e.g., the processor 522 in FIG. 5B).

When a wireless charging operation between the electronic device 901 and the external electronic device 903 is started, the electronic device 901 may transmit power by using the first WPT coil under the control of the processor 120 (e.g., the processor 522 in FIG. 5B).

The first WPT coil may be the WPT coil 601 included in the electronic device 901. The first sensor coil may be the sensor coil 602 included in the electronic device 901.

The second WPT coil may be the WPT coil 601 included in the external electronic device 903. The second sensor coil may be the sensor coil 602 included in the external electronic device 903.

In various embodiments, at operation 1211, the external electronic device 903 may receive the power from the electronic device 901 by using the second WPT coil under the control of the processor 120 (e.g., the processor 512 in FIG. 5A).

In various embodiments, at operation 1203, the electronic device 901 may transmit a power transmission message to the external electronic device 903 by using at least one of the first WPT coil or the first sensor coil under the control of the processor 120 (e.g., the processor 512 in FIG. 5A).

In various embodiments, if the electronic device 901 does not include the first sensor coil, the electronic device 901 may transmit a power transmission message to the external electronic device 903 by using the first WPT coil. If the electronic device 901 transmits the power transmission message to the external electronic device 903 by using the first WPT coil, although the external electronic device 903 includes both the second WPT coil and the second sensor coil, the external electronic device 903 may receive the power transmission message by using the second WPT coil.

In various embodiments, the electronic device 901 may include the first WPT coil and the first sensor coil. The external electronic device 903 may include the second WPT coil and the second sensor coil. The electronic device 901 may transmit a power transmission message to the external electronic device 903 by using at least one of the first WPT coil or the first sensor coil. For example, if the electronic device 901 transmits a power transmission message to the electronic device 903 by using at least one of the first WPT coil or the first sensor coil, the external electronic device 903 may receive the power transmission message by using at least one of the second WPT coil or the second sensor coil. When the electronic device 901 transmits the power transmission message to the external electronic device 903 by using the first WPT coil, the external electronic device 903 may receive the power transmission message by using the second WPT coil not the second sensor coil. When the electronic device 901 transmits the power transmission message to the external electronic device 903 by using the first sensor coil, the external electronic device 903 may receive the power transmission message by using the second sensor coil not the second WPT coil.

In various embodiments, the power transmission message may include information on a Q factor of the first sensor coil included in the electronic device 901. The information on the Q factor of the first sensor coil included in the electronic device 901 may include information on a reduction in the Q factor of the first sensor coil attributable to the external electronic device 903 when a foreign object is not present, for example. In various embodiments, the information on the Q factor of the first sensor coil included in the electronic device 901 is a predetermined value of the Q factor of the first sensor coil, for example, and may include a threshold value of the Q factor which is a criterion for identifying a foreign object.

In various embodiments, operation 1203 of transmitting, by the electronic device 901, the power transmission message to the external electronic device 903 by using at least one of the first WPT coil or the first sensor coil may be omitted. The power transmission message may be a message that provides notification that the electronic device 901 transmits power to the external electronic device 903.

In various embodiments, at operation 1213, the external electronic device 903 may perform a ping operation by using the second sensor coil under the control of the processor 120 (e.g., the processor 512 in FIG. 5A).

In various embodiments, at operation 1213, the external electronic device 903 may apply a resonant frequency current to the second sensor coil under the control of the processor 120 (e.g., the processor 512 in FIG. 5A). At this time, the external electronic device 903 may stop a current being input to the second sensor coil and perform a ping operation of applying the resonant frequency current to the second sensor coil.

In various embodiments, at operation 1213, the external electronic device 903 may periodically perform the ping operation using the second sensor coil while receiving the power from the electronic device 901 under the control of the processor 120 (e.g., the processor 512 in FIG. 5A).

In various embodiments, at operation 1213, the external electronic device 903 may receive a power transmission message and perform the ping operation using the second sensor coil on a one-off basis under the control of the processor 120 (e.g., the processor 512 in FIG. 5A).

In various embodiments, at operation 1215, the external electronic device 903 may measure a waveform of a current or voltage of the second sensor coil under the control of the processor 120 (e.g., the processor 512 in FIG. 5A).

For example, after stopping a current being input to the second sensor coil, while applying a resonant frequency current (e.g., AC) to the second sensor coil, the external electronic device 903 may measure an attenuation curve of the resonant frequency current applied to the second sensor coil or a voltage envelope of the sensor coil under the control of the processor 120 (e.g., the processor 512 in FIG. 5A) at operation 1215.

In various embodiments, at operation 1217, the external electronic device 903 may check a Q factor of the second sensor coil based on the measured waveform under the control of the processor 120 (e.g., the processor 512 in FIG. 5A).

In various embodiments, at operation 1219, the external electronic device 903 may identify the presence of a foreign object between the electronic device 901 and the external electronic device 903 (e.g., between the first WPT coil of the electronic device and the second WPT coil of the external electronic device) based on the checked Q factor under the control of the processor 120 (e.g., the processor 512 in FIG. 5A).

In various embodiments, the operation of identifying, by the external electronic device 903, the presence of a foreign object based on the checked Q factor at operation 1219 may include identifying the presence of the foreign object based on a threshold value of a Q factor of the second sensor coil included in the external electronic device 903 and the checked Q factor of the second sensor coil.

For example, when a value of the checked Q factor of the second sensor coil is smaller than the threshold value of the Q factor of the second sensor coil, the external electronic device 903 may identify that a foreign object is present under the control of the processor 120 (e.g., the processor 512 in FIG. 5A).

For example, when a value of the checked Q factor of the second sensor coil is greater than the threshold value of the Q factor of the second sensor coil, the external electronic device 903 may identify that a foreign object is not present under the control of the processor 120 (e.g., the processor 512 in FIG. 5A).

In various embodiments, at operation 1221, the external electronic device 903 may identify whether a foreign object is present between the electronic device 901 and the external electronic device 903 during the transmission and reception of wireless power based on the Q factor of the second sensor coil under the control of the processor 120 (e.g., the processor 512 in FIG. 5A).

In various embodiments, at operation 1221, the external electronic device 903 may identify whether a foreign object is present between the electronic device 901 and the external electronic device 903 during the transmission and reception of wireless power based on operation 1219 under the control of the processor 120 (e.g., the processor 512 in FIG. 5A).

In various embodiments, when it is identified that a foreign object is present at operation 1221, the external electronic device 903 may branch to operation 1223 under the control of the processor 120 (e.g., the processor 512 in FIG. 5A).

In various embodiments, when it is identified that a foreign object is not present at operation 1221, the external electronic device 903 may branch to operation 1225 under the control of the processor 120 (e.g., the processor 522 in FIG. 5A).

In various embodiments, when it is identified that a foreign object is present, at operation 1223, the external electronic device 903 may transmit a power transmission stop request message to the electronic device 901 by using one of the second WPT coil or the second sensor coil under the control of the processor 120 (e.g the processor 512 in FIG. 5A).

In various embodiments, when it is identified that a foreign object is not present, at operation 1225, the external electronic device 903 may continue to receive the power using the second WPT coil under the control of the processor 120 (e.g., the processor 512 in FIG. 5A).

In various embodiments, at operation 1205, the electronic device 901 may identify whether the power transmission stop request message has been received from the external electronic device 903 by using one of the first WPT coil or the first sensor coil under the control of the processor 120 (e.g., the processor 522 in FIG. 5B).

In various embodiments, when receiving the power transmission stop request message from the external electronic device 903 by using one of the first WPT coil or the first sensor coil at operation 1205, the electronic device 901 may branch to operation 1207 under the control of the processor 120 (e.g., the processor 522 in FIG. 5B).

In various embodiments, when not receiving the power transmission stop request message from the external electronic device 903 by using one of the first WPT coil or the first sensor coil at operation 1205, the electronic device 901 may branch to operation 1209 under the control of the processor 120 (e.g., the processor 522 in FIG. 5B).

In various embodiments, when receiving the power transmission stop request message from the external electronic device 903, at operation 1207, the electronic device 901 may stop transmitting the power by using one of the first WPT coil or the first sensor coil under the control of the processor 120 (e.g., the processor 522 in FIG. 5B).

In various embodiments, when not receiving the power transmission stop request message from the external electronic device 903 by using one of the first WPT coil or the first sensor coil, at operation 1209, the electronic device 901 may continue to transmit the power under the control of the processor 120 (e.g., the processor 522 in FIG. 5B).

Figure 13:
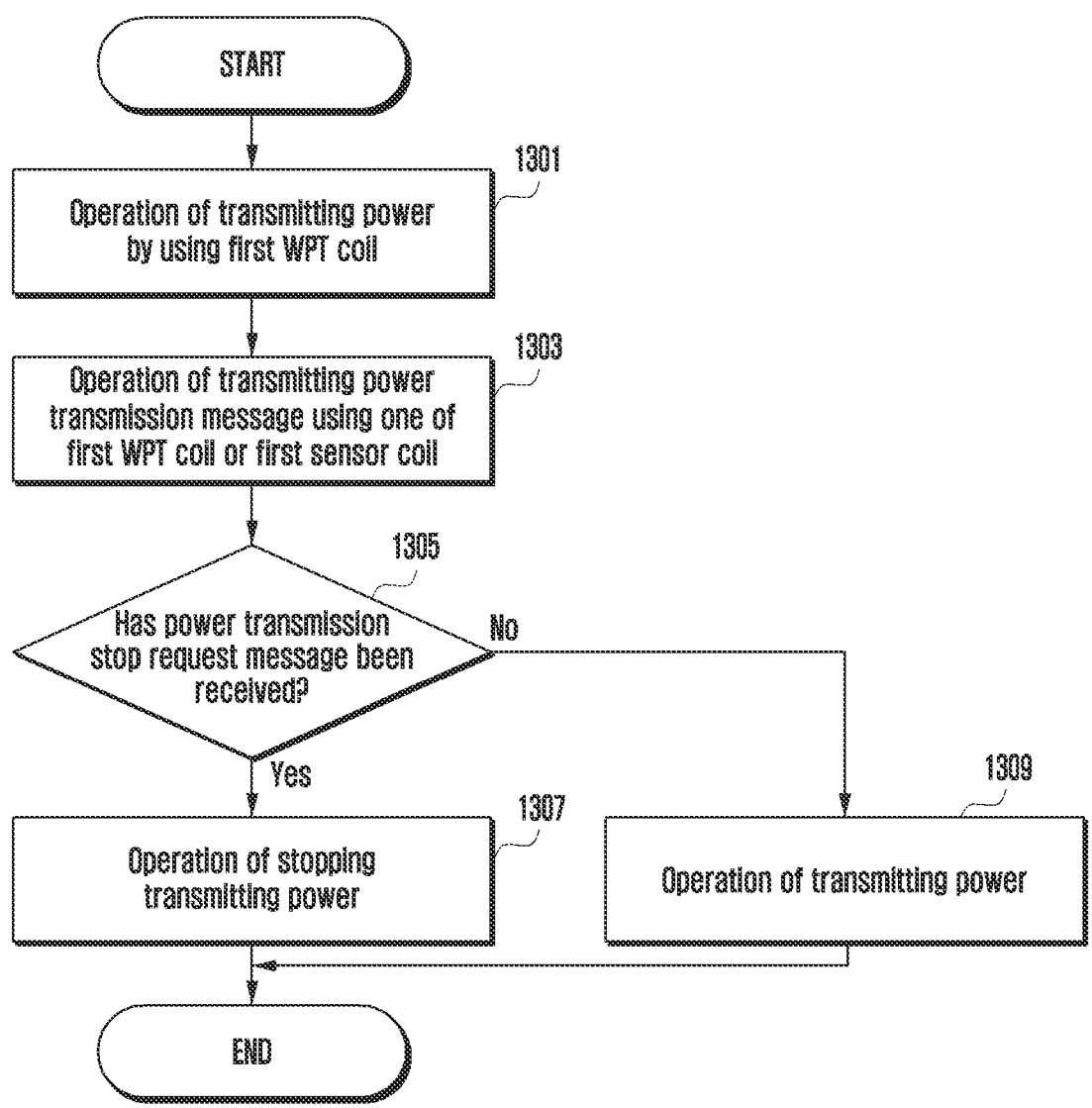
FIG. 13 is a flowchart illustrating a method of detecting a foreign object using a first sensor coil of an electronic device according to an embodiment of the disclosure.

FIG. 13 is a flowchart illustrating a method of detecting, by the electronic device, a foreign object using the first sensor coil according to an embodiment of the disclosure.

Referring to FIG. 13, the electronic device 901 is the same as the electronic device 901 in FIG. 12. The external electronic device 903 in FIG. 13 is the same as the external electronic device 903 in FIG. 12.

In various embodiments, at operation 1301, the electronic device 901 may transmit power by using the first WPT coil under the control of the processor 120 (e.g., the processor 522 in FIG. 5B).

When a wireless charging operation between the external electronic device 903 and the electronic device 901 is started, the electronic device 901 may transmit power by using the first WPT coil under the control of the processor 120 (e.g., the processor 522 in FIG. 5B).

In various embodiments, at operation 1303, the electronic device 901 may transmit a power transmission message to the external electronic device 903 by using at least one of the first WPT coil or the first sensor coil under the control of the processor 120 (e.g., the processor 512 in FIG. 5A).

In various embodiments, if the electronic device 901 does not include the first sensor coil, the electronic device 901 may transmit the power transmission message to the external electronic device 903 by using the first WPT coil. If the electronic device 901 transmits the power transmission message to the external electronic device 903 by using the first WPT coil, although the external electronic device 903 includes both the second WPT coil and the second sensor coil, the external electronic device 903 may receive the power transmission message by using the second WPT coil.

In various embodiments, the electronic device 901 may include the first WPT coil and the first sensor coil. The external electronic device 903 may include the second WPT coil and the second sensor coil. The electronic device 901 may transmit a power transmission message to the external electronic device 903 by using at least one of the first WPT coil or the first sensor coil. For example, if the electronic device 901 transmits the power transmission message to the electronic device 903 by using at least one of the first WPT coil or the first sensor coil, the external electronic device 903 may receive the power transmission message by using at least one of the second WPT coil or the second sensor coil. When the electronic device 901 transmits the power transmission message to the external electronic device 903 by using the first WPT coil, the external electronic device 903 may receive the power transmission message by using the second WPT coil not the second sensor coil. When the electronic device 901 transmits the power transmission message to the external electronic device 903 by using the first sensor coil, the external electronic device 903 may receive the power transmission message by using the second sensor coil not the second WPT coil.

In various embodiments, at operation 1305, the electronic device 901 may identify whether a power transmission stop request message has been received from the external electronic device 903 by using one of the first WPT coil or the first sensor coil under the control of the processor 120 (e.g., the processor 522 in FIG. 5B).

In various embodiments, when receiving the power transmission stop request message from the external electronic device 903 by using one of the first WPT coil or the first sensor coil at operation 1305, the electronic device 901 may branch to operation 1307 under the control of the processor 120 (e.g., the processor 522 in FIG. 5B).

In various embodiments, when not receiving the power transmission stop request message from the external electronic device 903 by using one of the first WPT coil or the first sensor coil at operation 1305, the electronic device 901 may branch to operation 1309 under the control of the processor 120 (e.g., the processor 522 in FIG. 5B).

In various embodiments, when receiving the power transmission stop request message from the external electronic device 903 by using one of the first WPT coil or the first sensor coil, the electronic device 901 may stop transmitting the power under the control of the processor 120 (e.g., the processor 522 in FIG. 5B) at operation 1307.

In various embodiments, when not receiving the power transmission stop request message from the external electronic device 903 by using one of the first WPT coil or the first sensor coil, the electronic device 901 may continue to transmit the power under the control of the processor 120 (e.g., the processor 522 in FIG. 5B) at operation 1309.

Figure 14:
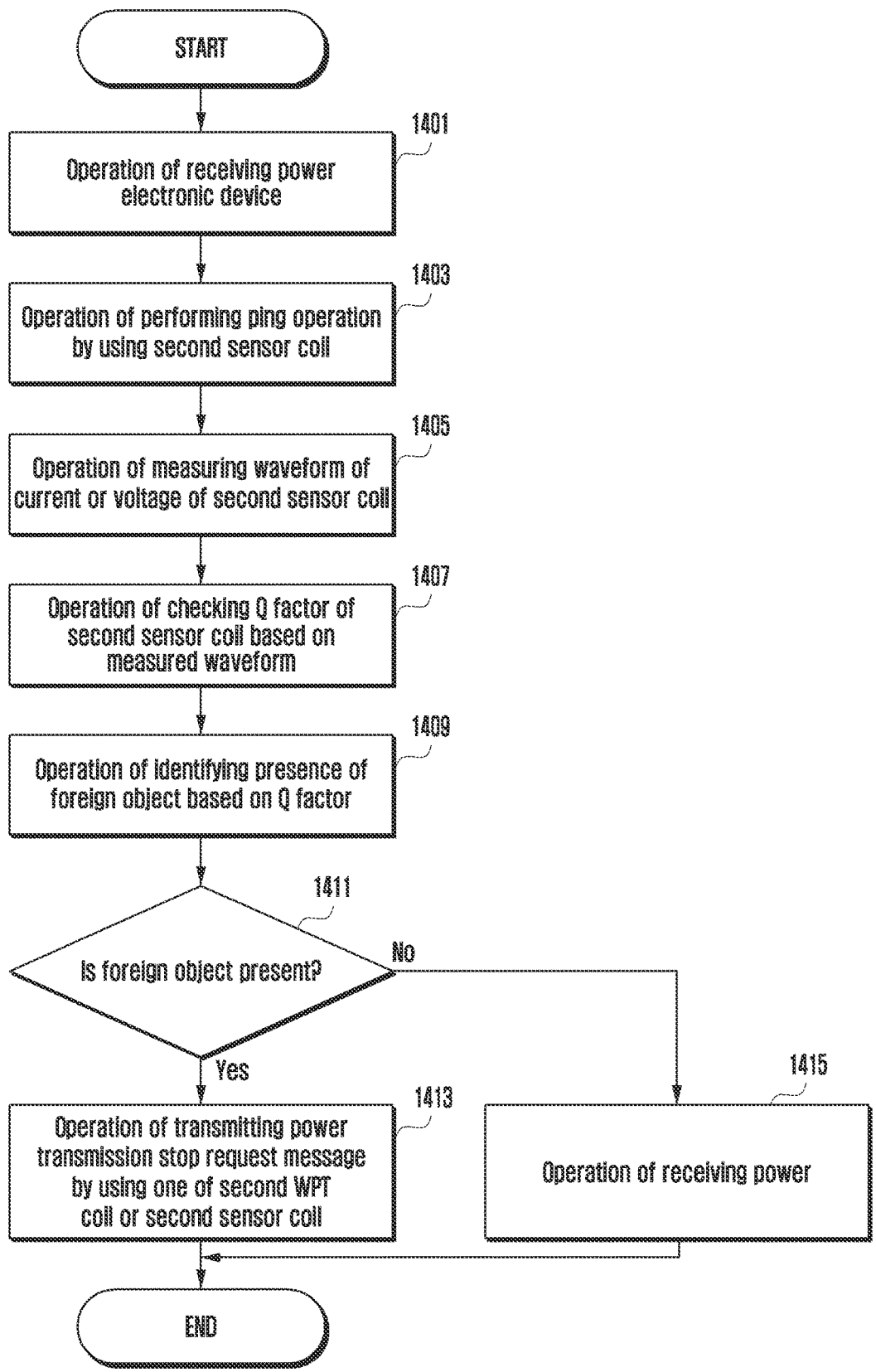
FIG. 14 is a flowchart illustrating a method of detecting a foreign object using a second sensor coil of an external electronic device according to an embodiment of the disclosure.

FIG. 14 is a flowchart illustrating a method of detecting, by an external electronic device, a foreign object using a second sensor coil according to an embodiment of the disclosure.

Referring to FIG. 14, the electronic device 901 is the same as the electronic device 901 in FIG. 12. The external electronic device 903 in FIG. 14 is the same as the external electronic device 903 in FIG. 12.

In various embodiments, at operation 1401, the external electronic device 903 may receive power from the electronic device 901 by using the second WPT coil under the control of the processor 120 (e.g., the processor 512 in FIG. 5A).

In various embodiments, at operation 1403, the external electronic device 903 may perform a ping operation by using the second sensor coil under the control of the processor 120 (e.g., the processor 512 in FIG. 5A).

In various embodiments, at operation 1403, the external electronic device 903 may perform a ping operation of applying a resonant frequency current to the second sensor coil under the control of the processor 120 (e.g., the processor 512 in FIG. 5A). At this time, the external electronic device 903 may stop a current being input to the second sensor coil and apply the resonant frequency current to the second sensor coil.

In various embodiments, at operation 1403, the external electronic device 903 may periodically perform the ping operation using the second sensor coil while receiving the power from the electronic device 901 under the control of the processor 120 (e.g., the processor 512 in FIG. 5A).

In various embodiments, at operation 1403, the external electronic device 903 may receive a power transmission message and perform the ping operation on a one-off basis by using the second sensor coil under the control of the processor 120 (e.g., the processor 512 in FIG. 5A).

In various embodiments, at operation 1405, the external electronic device 903 may measure a waveform of a current or voltage of the second sensor coil under the control of the processor 120 (e.g., the processor 512 in FIG. 5A).

For example, after stopping a current being input to the second sensor coil, while applying a resonant frequency current (e.g., AC) to the second sensor coil, the external electronic device 903 may measure an attenuation curve of the resonant frequency current applied to the second sensor coil or a voltage envelope of the sensor coil under the control of the processor 120 (e.g., the processor 512 in FIG. 5A) at operation 1405.

In various embodiments, at operation 1407, the external electronic device 903 may check a Q factor of the second sensor coil based on the measured waveform under the control of the processor 120 (e.g., the processor 512 in FIG. 5A).

In various embodiments, at operation 1409., the external electronic device 903 may identify the presence of a foreign object based on the checked Q factor under the control of the processor 120 (e.g., the processor 512 in FIG. 5A).

In various embodiments, the operation of identifying, by the external electronic device 903, the presence of a foreign object based on the checked Q factor at operation 1409, may include identifying the presence of a foreign object based on a threshold value of a Q factor of the second sensor coil included in the external electronic device 903 and the checked Q factor of the second sensor coil.

For example, when a value of the checked Q factor of the second sensor coil is smaller than the threshold value of the Q factor of the second sensor coil, the external electronic device 903 may identify that a foreign object is present under the control of the processor 120 (e.g., the processor 512 in FIG. 5A).

For example, when a value of the checked Q factor of the second sensor coil is greater than the threshold value of the Q factor of the second sensor coil, the external electronic device 903 may identify that a foreign object is not present under the control of the processor 120 (e.g., the processor 512 in FIG. 5A).

In various embodiments, at operation 1411, the external electronic device 903 may identify whether a foreign object is present between the electronic device 901 and the external electronic device 903 during the transmission and reception of wireless power based on the Q factor of the second sensor coil under the control of the processor 120 (e.g., the processor 512 in FIG. 5A).

In various embodiments, at operation 1411, the external electronic device 903 may identify whether a foreign object is present between the electronic device 901 and the external electronic device 903 during the transmission and reception of wireless power based on operation 1409 under the control of the processor 120 (e.g., the processor 512 in FIG. 5A).

In various embodiments, when it is identified that a foreign object is present at operation 1411, the external electronic device 903 may branch to operation 1413 under the control of the processor 120 (e.g., the processor 512 in FIG. 5A).

In various embodiments, when it is identified that a foreign object is not present at operation 1411, the external electronic device 903 may branch to operation 1415 under the control of the processor 120 (e.g., the processor 522 in FIG. 5A).

In various embodiments, when it is identified that a foreign object is present, at operation 1413, the external electronic device 903 may transmit a power transmission stop request message to the electronic device 901 by using one of the second WPT coil or the second sensor coil under the control of the processor 120 (e.g., the processor 512 in FIG. 5A).

In various embodiments, when it is identified that a foreign object is not present, at operation 1415, the external electronic device 903 may continue to receive the power using the second WPT coil under the control of the processor 120 (e.g., the processor 512 in FIG. 5A).

Figure 15:
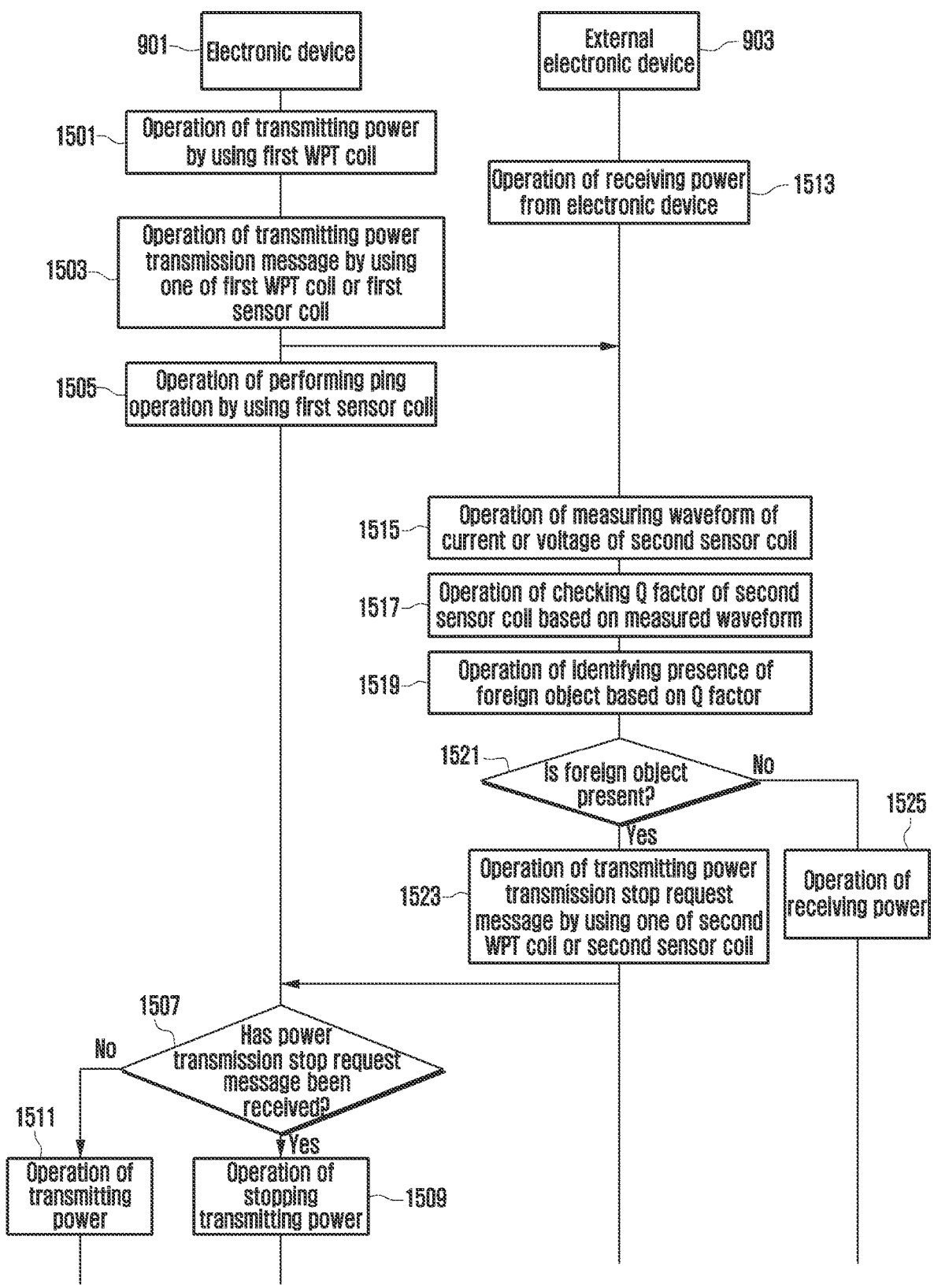
FIG. 15 is a flowchart illustrating a method of detecting a foreign object using a sensor coil between an electronic device and an external electronic device according to an embodiment of the disclosure.

FIG. 15 is a flowchart illustrating a method of detecting a foreign object using a sensor coil between an electronic device and an external electronic device according to an embodiment of the disclosure.

Referring to FIG. 15, the electronic device 901 according to various embodiments is an electronic device capable of wirelessly transmitting and receiving power. The electronic device 901 may wirelessly transmit power to the external electronic device 903. The electronic device 901 may be a wireless power transmission device, for example.

The external electronic device 903 according to various embodiments is an electronic device capable of wirelessly transmitting and receiving power. The external electronic device 903 may wirelessly receive power from the electronic device 901. The external electronic device 903 may be a wireless power reception device, for example.

In various embodiments, the electronic device 901 and the external electronic device 903 may include elements (e.g., the processor 120 and the memory 130) of the electronic device 101 in FIG. 1.

In various embodiments, the electronic device 901 is a wireless power transmission device, and may include elements of the second electronic device 502 in FIG. 5B.

In various embodiments, the external electronic device 903 is a wireless power reception device, and may include elements of the first electronic device 501 in FIG. 5A.

In various embodiments, at operation 1501, the electronic device 901 may transmit power by using the first WPT coil under the control of the processor 120 (e.g., the processor 522 in FIG. 5B).

When a wireless charging operation between the external electronic device 903 and the electronic device 901 is started, the electronic device 901 may transmit power by using the first WPT coil under the control of the processor 120 (e.g., the processor 522 in FIG. 5B).

The first WPT coil may be the WPT coil 601 included in the electronic device 901. The first sensor coil may be the sensor coil 602 included in the electronic device 901.

The second WPT coil may be the WPT coil 601 included in the external electronic device 903. The second sensor coil may be the sensor coil 602 included in the external electronic device 903.

In various embodiments, at operation 1513, the external electronic device 903 may receive the power from the electronic device 901 by using the second WPT coil under the control of the processor 120 (e.g., the processor 512 in FIG. 5A).

In various embodiments, at operation 1503, the electronic device 901 may transmit a power transmission message to the external electronic device 903 by using at least one of the first WPT coil or the first sensor coil under the control of the processor 120 (e.g., the processor 512 in FIG. 5A).

In various embodiments, if the electronic device 901 does not include the first sensor coil, the electronic device 901 may transmit a power transmission message to the external electronic device 903 by using the first WPT coil. If the electronic device 901 transmits the power transmission message to the external electronic device 903 by using the first WPT coil, although the external electronic device 903 includes both the second WPT coil and the second sensor coil, the external electronic device 903 may receive the power transmission message by using the second WPT coil.

In various embodiments, the electronic device 901 may include the first WPT coil and the first sensor coil, and the external electronic device 903 may include the second WPT coil and the second sensor coil. The electronic device 901 may transmit a power transmission message to the external electronic device 903 by using at least one of the first WPT coil or the first sensor coil. For example, if the electronic device 901 transmits the power transmission message to the electronic device 903 by using at least one of the first WPT coil or the first sensor coil, the external electronic device 903 may receive the power transmission message by using at least one of the second WPT coil or the second sensor coil. When the electronic device 901 transmits the power transmission message to the external electronic device 903 by using the first WPT coil, the external electronic device 903 may receive the power transmission message by using the second WPT coil not the second sensor coil. When the electronic device 901 transmits the power transmission message to the external electronic device 903 by using the first sensor coil, the external electronic device 903 may receive the power transmission message by using the second sensor coil not the second WPT coil.

In various embodiments, the power transmission message may include information on a Q factor of the first sensor coil included in the electronic device 901. The information on the Q factor of the first sensor coil included in the electronic device 901 may include information on a reduction in the Q factor of the first sensor coil attributable to the external electronic device 903 when a foreign object is not present, for example. In various embodiments, the information on the Q factor of the first sensor coil included in the electronic device 901 is a predetermined value of the Q factor of the first sensor coil, for example, and may include a threshold value of the Q factor which is a criterion for identifying a foreign object. The Q factor of the first sensor coil included in the electronic device 901 and/or a threshold value of a Q factor of the second sensor coil included in the external electronic device 903 may be the same or different from each other.

In various embodiments, operation 1503 of transmitting, by the electronic device 901, the power transmission message to the external electronic device 903 by using at least one of the first WPT coil or the first sensor coil may be omitted. The power transmission message may be a message that provides notification that the electronic device 901 transmits power to the external electronic device 903.

In various embodiments, at operation 1505, the electronic device 901 may perform a ping operation by using the first sensor coil under the control of the processor 120 (e.g., the processor 522 in FIG. 5B).

In various embodiments, at operation 1505, the electronic device 901 may apply a resonant frequency current to the first sensor coil under the control of the processor 120 (e.g., the processor 522 in FIG. 5B). At this time, the electronic device 901 may stop a current being input to the first sensor coil and apply the resonant frequency current to the first sensor coil.

In various embodiments, at operation 1505, the electronic device 901 may periodically perform the ping operation by using the first sensor coil while transmitting the power to the external electronic device 903 under the control of the processor 120 (e.g., the processor 522 in FIG. 5B).

In various embodiments, at operation 1505, the electronic device 901 may perform the ping operation using the first sensor coil on a one-off basis under the control of the processor 120 (e.g., the processor 522 in FIG. 5B).

In various embodiments, at operation 1515, the external electronic device 903 may measure a waveform of a current or voltage of the second sensor coil under the control of the processor 120 (e.g., the processor 512 in FIG. 5A).

For example, while or after the electronic device 901 performs the ping operation using the first sensor coil, at operation 1515, the external electronic device 903 may measure an attenuation curve of a resonant frequency current (e.g., AC) applied to the second sensor coil or a voltage envelope of the sensor coil under the control of the processor 120 (e.g., the processor 512 in FIG. 5A).

In various embodiments, at operation 1517, the external electronic device 903 may check a Q factor of the second sensor coil based on the measured waveform under the control of the processor 120 (e.g., the processor 512 in FIG. 5A).

In various embodiments, at operation 1519, the external electronic device 903 may identify the presence of a foreign object based on the checked Q factor under the control of the processor 120 (e.g., the processor 512 in FIG. 5A).

In various embodiments, the operation of identifying, by the external electronic device 903, the presence of a foreign object based on the checked Q factor at operation 1519 may include identifying the presence of a foreign object based on the threshold value of the Q factor of the second sensor coil included in the external electronic device 903 and the checked Q factor of the second sensor coil, For example, when a value of the checked Q factor of the second sensor coil is smaller than the threshold value of the Q factor of the second sensor coil, the external electronic device 903 may identify that a foreign object is present under the control of the processor 120 (e.g., the processor 512 in FIG. 5A).

For example, when a value of the checked Q factor of the second sensor coil is greater than the threshold value of the Q factor of the second sensor coil, the external electronic device 903 may identify that a foreign object is not present under the control of the processor 120 (e.g., the processor 512 in FIG. 5A).

In various embodiments, at operation 1521, the external electronic device 903 may identify whether a foreign object is present between the electronic device 901 and the external electronic device 903 during the transmission and reception of wireless power based on the Q factor of the second sensor coil under the control of the processor 120 (e.g., the processor 512 in FIG. 5A).

In various embodiments, at operation 1521, the external electronic device 903 may identify whether a foreign object is present between the electronic device 901 and the external electronic device 903 during the transmission and reception of wireless power based on operation 1519 under the control of the processor 120 (e.g., the processor 512 in FIG. 5A).

In various embodiments, when it is identified that a foreign object is present, at operation 1521, the external electronic device 903 may branch to operation 1523 under the control of the processor 120 (e.g., the processor 512 in FIG. 5A).

In various embodiments, when it is identified that a foreign object is not present at operation 1521, the external electronic device 903 may branch to operation 1525 under the control of the processor 120 (e.g., the processor 522 in FIG. 5A).

In various embodiments, when it is identified that a foreign object is present, at operation 1523, the external electronic device 903 may transmit a power transmission stop request message to the electronic device 901 by using one of the second WPT coil or the second sensor coil under the control of the processor 120 (e.g., the processor 512 in FIG. 5A).

In various embodiments, when it is identified that a foreign object is not present, at operation 1525, the external electronic device 903 may continue to receive the power by using the second WPT coil under the control of the processor 120 (e.g., the processor 512 in FIG. 5A).

In various embodiments, at operation 1507, the electronic device 901 may identify whether the power transmission stop request message has been received from the external electronic device 903 by using one of the first WPT coil or the first sensor coil under the control of the processor 120 (e.g., the processor 522 in FIG. 5B).

In various embodiments, when receiving the power transmission stop request message from the external electronic device 903 by using one of the first WPT coil or the first sensor coil at operation 1507, the electronic device 901 may branch to operation 1509 under the control of the processor 120 (e.g., the processor 522 in FIG. 5B).

In various embodiments, when not receiving the power transmission stop request message from the external electronic device 903 by using one of the first WPT coil or the first sensor coil at operation 1507, the electronic device 901 may branch to operation 1511 under the control of the processor 120 (e.g., the processor 522 in FIG. 5B).

In various embodiments, when receiving the power transmission stop request message from the external electronic device 903 by using one of the first WPT coil or the first sensor coil, the electronic device 901 may stop transmitting the power under the control of the processor 120 (e.g., the processor 522 in FIG. 5B) at operation 1509.

In various embodiments, when not receiving the power transmission stop request message from the external electronic device 903 by using one of the first WPT coil or the first sensor coil, the electronic device 901 may continue to transmit the power under the control of the processor 120 (e.g., the processor 522 in FIG. 5B) at operation 1511.

Figure 16:
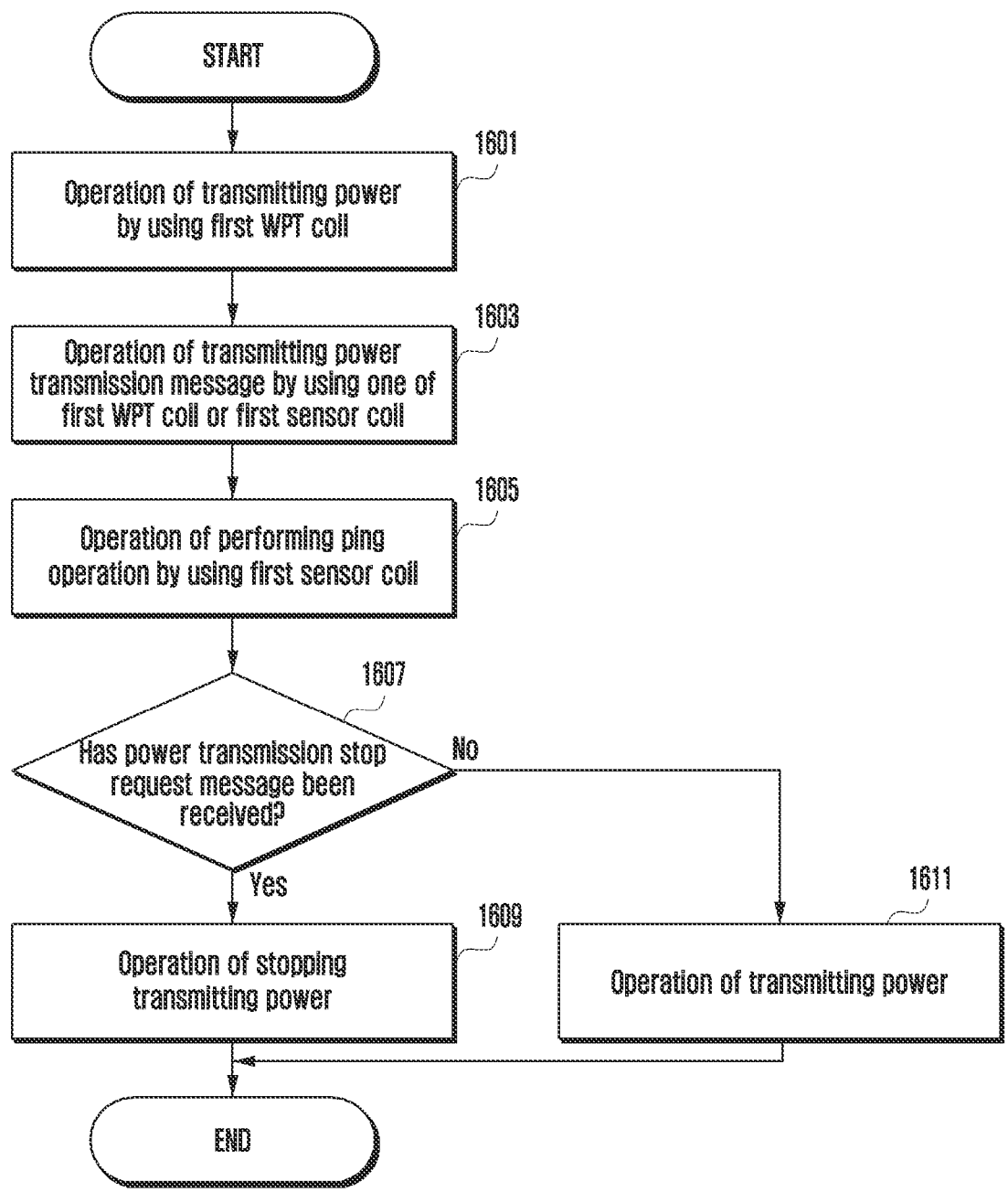
FIG. 16 is a flowchart illustrating a method of detecting a foreign object using a first sensor coil of an electronic device according to an embodiment of the disclosure.

FIG. 16 is a flowchart illustrating a method of detecting, by an electronic device, a foreign object using a first sensor coil according to an embodiment of the disclosure.

Referring to FIG. 16, the electronic device 901 is the same as the electronic device 901 in FIG. 15. The external electronic device 903 in FIG. 16 is the same as the external electronic device 903 in FIG. 15.

In various embodiments, at operation 1601, the electronic device 901 may transmit power by using the first WPT coil under the control of the processor 120 (e.g., the processor 522 in FIG. 5B).

When a wireless charging operation between the external electronic device 903 and the electronic device 901 is started, the electronic device 901 may transmit power by using the first WPT coil under the control of the processor 120 (e.g., the processor 522 in FIG. 5B).

In various embodiments, at operation 1603, the electronic device 901 may transmit a power transmission message to the external electronic device 903 by using at least one of the first WPT coil or the first sensor coil under the control of the processor 120 (e.g., the processor 512 in FIG. 5A).

In various embodiments, if the electronic device 901 does not include the first sensor coil, the electronic device 901 may transmit a power transmission message to the external electronic device 903 by using the first WPT coil. If the electronic device 901 transmits the power transmission message to the external electronic device 903 by using the first WPT coil, although the external electronic device 903 includes both the second WPT coil and the second sensor coil, the external electronic device 903 may receive the power transmission message by using the second WPT coil.

In various embodiments, the electronic device 901 may include the first WPT coil and the first sensor coil, and the external electronic device 903 may include the second WPT coil and the second sensor coil. The electronic device 901 may transmit a power transmission message to the external electronic device 903 by using at least one of the first WPT coil or the first sensor coil. For example, when the electronic device 901 transmits a power transmission message to the electronic device 903 by using at least one of the first WPT coil or the first sensor coil, the external electronic device 903 may receive the power transmission message by using at least one of the second WPT coil or the second sensor coil. When the electronic device 901 transmits the power transmission message to the external electronic device 903 by using the first WPT coil, the external electronic device 903 may receive the power transmission message by using the second WPT coil not the second sensor coil. When the electronic device 901 transmits the power transmission message to the external electronic device 903 by using the first sensor coil, the external electronic device 903 may receive the power transmission message by using the second sensor coil not the second WPT coil.

In various embodiments, at operation 1605, the electronic device 901 may perform a ping operation by using the first sensor coil under the control of the processor 120 (e.g., the processor 522 in FIG. 5B).

In various embodiments, at operation 1605, the electronic device 901 may apply a resonant frequency current to the first sensor coil under the control of the processor 120 (e.g., the processor 522 in FIG. 5B). At this time, the electronic device 901 may stop a current being input to the first sensor coil and apply the resonant frequency current to the first sensor coil.

In various embodiments, at operation 1605, the electronic device 901 may periodically perform the ping operation using the first sensor coil while transmitting the power to the external electronic device 903 under the control of the processor 120 (e.g., the processor 522 in FIG. 5B).

In various embodiments, at operation 1605, the electronic device 901 may perform the ping operation using the first sensor coil on a one-off basis under the control of the processor 120 (e.g., the processor 522 in FIG. 5B).

In various embodiments, at operation 1607, the electronic device 901 may identify whether the power transmission stop request message has been received from the external electronic device 903 by using one of the first WPT coil or the first sensor coil under the control of the processor 120 (e.g., the processor 522 in FIG. 5B), In various embodiments, when receiving the power transmission stop request message from the external electronic device 903 by using one of the first WPT coil or the first sensor coil at operation 1607, the electronic device 901 may branch to operation 1609 under the control of the processor 120 (e.g., the processor 522 in FIG. 5B).

In various embodiments, when not receiving the power transmission stop request message from the external electronic device 903 by using one of the first WPT coil or the first sensor coil at operation 1607, the electronic device 901 may branch to operation 1611 under the control of the processor 120 (e.g., the processor 522 in FIG. 5B).

In various embodiments, when receiving the power transmission stop request message from the external electronic device 903 by using one of the first WPT coil or the first sensor coil, the electronic device 901 may stop transmitting the power under the control of the processor 120 (e.g., the processor 522 in FIG. 5B) at operation 1609.

In various embodiments, when not receiving the power transmission stop request message from the external electronic device 903 by using one of the first WPT coil or the first sensor coil, the electronic device 901 may continue to transmit the power under the control of the processor 120 (e.g., the processor 522 in FIG. 5B) at operation 1611.

Figure 17:
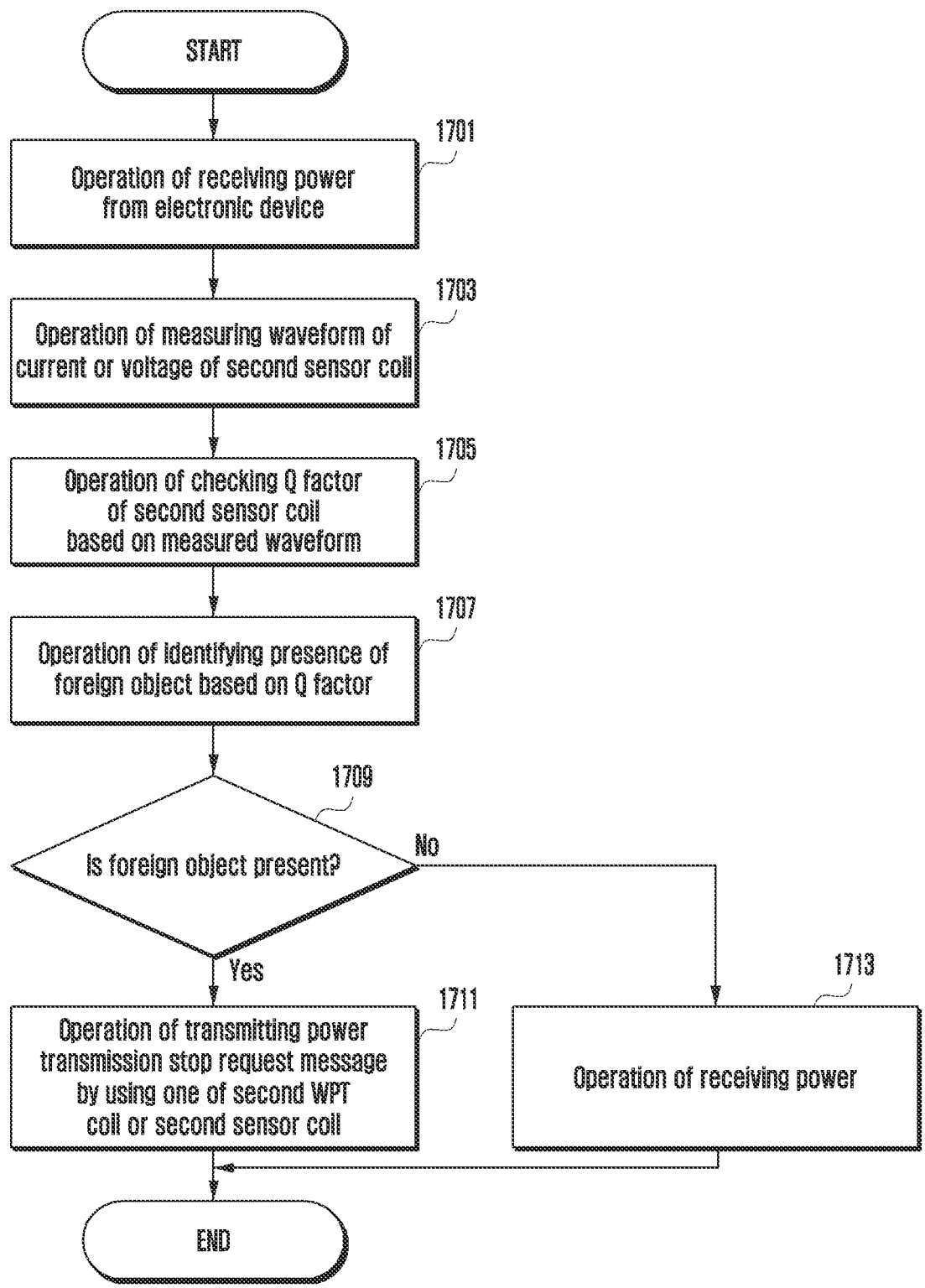
FIG. 17 is a flowchart illustrating a method of detecting a foreign object using a second sensor coil of an external electronic device according to an embodiment of the disclosure.

FIG. 17 is a flowchart illustrating a method of detecting, by an external electronic device, a foreign object using a second sensor coil according to an embodiment of the disclosure.

Referring to FIG. 17, the electronic device 901 is the same as the electronic device 901 in FIG. 15. The external electronic device 903 in FIG. 17 is the same as the external electronic device 903 in FIG. 15.

In various embodiments, at operation 1701, the external electronic device 903 may receive power from the electronic device 901 by using the second WPT coil under the control of the processor 120 (e.g., the processor 512 in FIG. 5A).

In various embodiments, at operation 1703, the external electronic device 903 may measure a waveform of a current or voltage of the second sensor coil under the control of the processor 120 (e.g., the processor 512 in FIG. 5A).

For example, while or after the electronic device 901 performs a ping operation using the first sensor coil, at operation 1703, the external electronic device 903 may measure an attenuation curve of a resonant frequency current (e.g., AC) applied to the second sensor coil or a voltage envelope of the sensor coil under the control of the processor 120 (e.g., the processor 512 in FIG. 5A).

In various embodiments, at operation 1705, the external electronic device 903 may check a Q factor of the second sensor coil based on the measured waveform under the control of the processor 120 (e.g., the processor 512 in FIG. 5A).

In various embodiments, at operation 1707, the external electronic device 903 may identify the presence of a foreign object based on the checked Q factor under the control of the processor 120 (e.g., the processor 512 in FIG. 5A).

In various embodiments, the operation of identifying, by the external electronic device 903, the presence of the foreign object based on the checked Q factor at operation 1707 may include identifying the presence of a foreign object based on a threshold value of the Q factor of the second sensor coil included in the external electronic device 903 and the checked Q factor of the second sensor coil.

For example, when a value of the checked Q factor of the second sensor coil is smaller than the threshold value of the Q factor of the second sensor coil, the external electronic device 903 may identify that a foreign object is present under the control of the processor 120 (e.g., the processor 512 in FIG. 5A).

For example, when a value of the checked Q factor of the second sensor coil is greater than the threshold value of the Q factor of the second sensor coil, the external electronic device 903 may identify that a foreign object is not present under the control of the processor 120 (e.g., the processor 512 in FIG. 5A).

In various embodiments, at operation 1709, the external electronic device 903 may identify whether a foreign object is present between the electronic device 901 and the external electronic device 903 during the transmission and reception of wireless power based on the Q factor of the second sensor coil under the control of the processor 120 (e.g., the processor 512 in FIG. 5A).

In various embodiments, at operation 1709, the external electronic device 903 may identify whether a foreign object is present between the electronic device 901 and the external electronic device 903 during the transmission and reception of wireless power based on operation 1707 under the control of the processor 120 (e.g., the processor 512 in FIG. 5A).

In various embodiments, when it is identified that a foreign object is present at operation 1709, the external electronic device 903 may branch to operation 1711 under the control of the processor 120 (e.g., the processor 512 in FIG. 5A).

In various embodiments, when it is identified that a foreign object is not present at operation 1709, the external electronic device 903 may branch to operation 1713 under the control of the processor 120 (e.g., the processor 522 in FIG. 5A).

In various embodiments, when it is identified that a foreign object is present, at operation 1711, the external electronic device 903 may transmit a power transmission stop request message to the electronic device 901 by using one of the second WPT coil or the second sensor coil under the control of the processor 120 (e.g., the processor 512 in FIG. 5A).

In various embodiments, when it is identified that a foreign object is not present, at operation 1713, the external electronic device 903 may continue to receive the power using the second WPT coil under the control of the processor 120 (e.g., the processor 512 in FIG. 5A).

Figure 18:
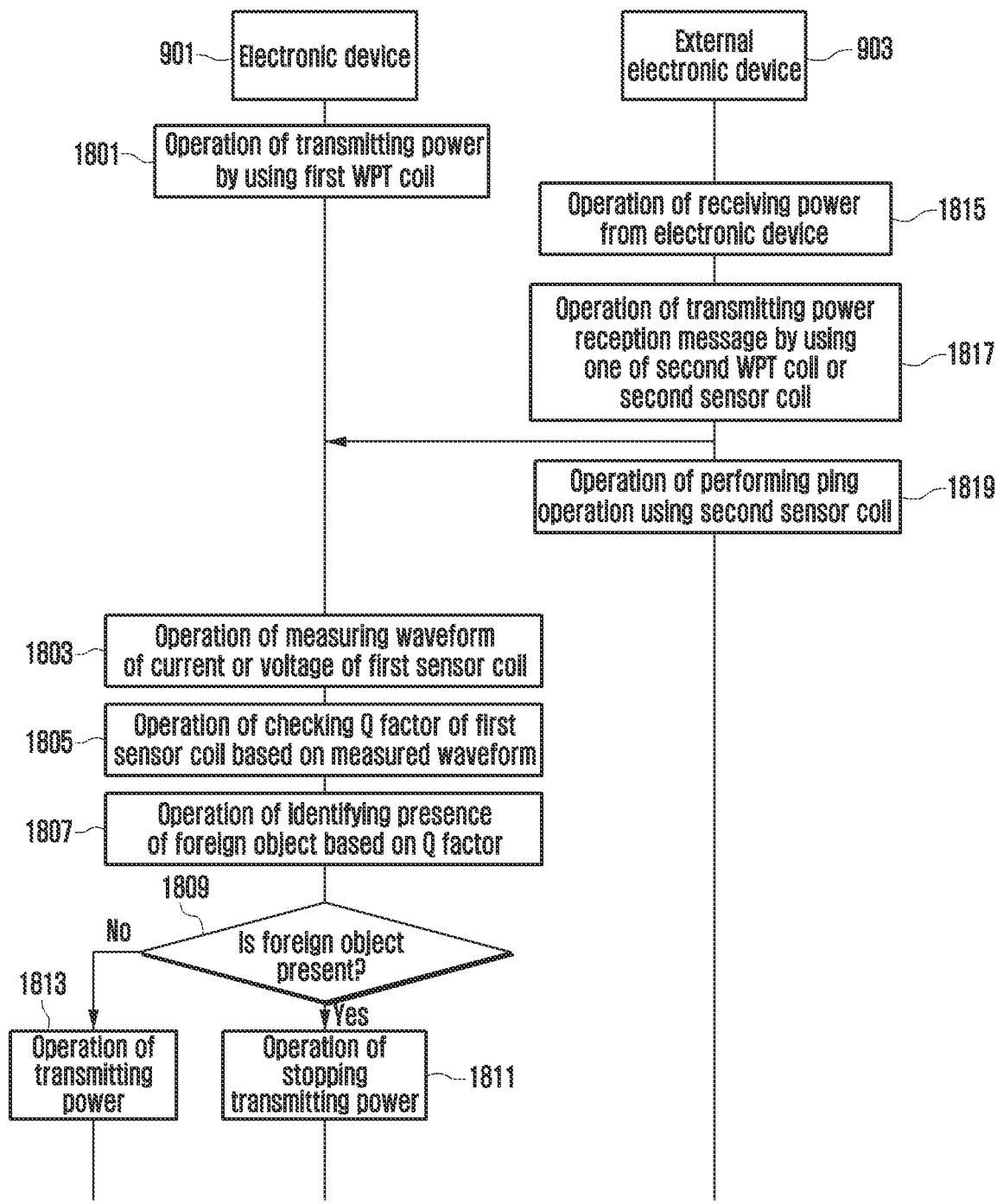
FIG. 18 is a flowchart illustrating a method of detecting a foreign object using a sensor coil between an electronic device and an external electronic device according to an embodiment of the disclosure.

FIG. 18 is a flowchart illustrating a method of detecting a foreign object using a sensor coil between an electronic device and an external electronic device according to an embodiment of the disclosure.

Referring to FIG. 18, the electronic device 901 according to various embodiments is an electronic device capable of wirelessly transmitting and receiving power. The electronic device 901 may wirelessly transmit power to the external electronic device 903. The electronic device 901 may be a wireless power transmission device, for example.

The external electronic device 903 according to various embodiments is an electronic device capable of wirelessly transmitting and receiving power. The external electronic device 903 may wirelessly receive power from the electronic device 901. The external electronic device 903 may be a wireless power reception device, for example.

In various embodiments, the electronic device 901 and the external electronic device 903 may include elements (e.g., the processor 120 and the memory 130) of the electronic device 101 in FIG. 1.

In various embodiments, the electronic device 901 is a wireless power transmission device, and may include elements of the second electronic device 502 in FIG. 5B.

In various embodiments, the external electronic device 903 is a wireless power reception device, and may include elements of the first electronic device 501 in FIG. 5A.

In various embodiments, the electronic device 901 may include the WPT coil 601 and the sensor coil 602 described with reference to FIGS. 6A, 6B, and 7. In an embodiment, the electronic device 901 may include the WPT coil 601 except the sensor coil 602 described with reference to FIGS. 6A, 6B, and 7.

In various embodiments, the external electronic device 903 may include the WPT coil 601 and the sensor coil 602 described with reference to FIGS. 6A, 6B, and 7. In an embodiment, the external electronic device 903 may include the WPT coil 601 except the sensor coil 602 described with reference to FIGS. 6A, 6B, and 7.

In various embodiments, at operation 1801, the electronic device 901 may transmit power by using the first WPT coil under the control of the processor 120 (e.g., the processor 522 in FIG. 5B).

When a wireless charging operation between the external electronic device 903 and the electronic device 901 is started, the electronic device 901 may transmit power by using the first WPT coil under the control of the processor 120 (e.g., the processor 522 in FIG. 5B).

The first WPT coil may be the WPT coil 601 included in the electronic device 901. The first sensor coil may be the sensor coil 602 included in the electronic device 901.

The second WPT coil may be the WPT coil 601 included in the external electronic device 903. The second sensor coil may be the sensor coil 602 included in the external electronic device 903.

In various embodiments, at operation 1815, the external electronic device 903 may receive the power from the electronic device 901 by using the second WPT coil under the control of the processor 120 (e.g., the processor 512 in FIG. 5A).

In various embodiments, when receiving the power from the electronic device 901, the external electronic device 903 may transmit a power reception message to the electronic device 901 by using at least one of the second WPT coil or the second sensor coil under the control of the processor 120 (e.g., the processor 512 in FIG. 5A) at operation 1817.

In various embodiments, if the external electronic device 903 does not include the second sensor coil, the external electronic device 903 may transmit the power reception message to the electronic device 901 by using the second WPT coil. If the external electronic device 903 transmits the power reception message to the electronic device 901 by using the second WPT coil, although the electronic device 901 includes both the first WPT coil and the first sensor coil, the electronic device 901 may receive the power reception message by using the first WPT coil.

In various embodiments, the electronic device 901 may include the first WPT coil and the first sensor coil. The external electronic device 903 may include the second WPT coil and the second sensor coil. The external electronic device 903 may transmit the power reception message to the electronic device 901 by using at least one of the second WPT coil or the second sensor coil. For example, if the external electronic device 903 transmits the power reception message to the electronic device 901 by using at least one of the second WPT coil or the second sensor coil, the electronic device 901 may receive the power reception message by using at least one of the first WPT coil or the first sensor coil. When the external electronic device 903 transmits the power reception message to the electronic device 901 by using the second WPT coil, the electronic device 901 may receive the power reception message by using the first WPT coil not the first sensor coil. When the external electronic device 903 transmits the power reception message to the electronic device 901 by using the second sensor coil, the electronic device 901 may receive the power reception message by using the first sensor coil not the first WPT coil.

In various embodiments, the power reception message may include information on a Q factor of the second sensor coil included in the external electronic device 903. The information on the Q factor of the second sensor coil included in the external electronic device 903 may include information on a reduction of the Q factor of the second sensor coil attributable to the electronic device 901 when a foreign object is not present, for example. In various embodiments, the information on the Q factor of the second sensor coil included in the external electronic device 903 is a predetermined value of the Q factor of the second sensor coil, for example, and may include a threshold value of the Q factor which is a criterion for identifying a foreign object.

In various embodiments, when receiving the power from the electronic device 901, operation 1817 of transmitting, by the external electronic device 903, the power reception message to the electronic device 901 by using at least one of the second WPT coil or the second sensor coil may be omitted. The power reception message may be a message that provides notification that the external electronic device 903 receives the power from the electronic device 901.

In various embodiments, at operation 1819, the external electronic device 903 may perform a ping operation using the second sensor coil under the control of the processor 120 (e.g., the processor 512 in FIG. 5A).

In various embodiments, at operation 1819, the external electronic device 903 may apply a resonant frequency current to the second sensor coil under the control of the processor 120 (e.g., the processor 512 in FIG. 5A). At this time, the external electronic device 903 may stop a current being input to the second sensor coil and apply the resonant frequency current to the second sensor coil.

In various embodiments, at operation 1819, the external electronic device 903 may periodically perform the ping operation using the second sensor coil while receiving the power from the electronic device 901 under the control of the processor 120 (e.g., the processor 512 in FIG. 5A).

In various embodiments, at operation 1819, the external electronic device 903 may perform the ping operation using the second sensor coil on a one-off basis under the control of the processor 120 (e.g., the processor 512 in FIG. 5A).

In various embodiments, at operation 1803, the electronic device 901 may measure a waveform of a current or voltage of the first sensor coil under the control of the processor 120 (e.g., the processor 522 in FIG. 5B).

For example, while or after the external electronic device 903 performs the ping operation using the second sensor coil, at operation 1803, the electronic device 901 may measure an attenuation curve of a resonant frequency current (e.g., AC) applied to the first sensor coil or a voltage envelope of the sensor coil under the control of the processor 120 (e.g., the processor 522 in FIG. 5B).

In various embodiments, at operation 1805, the electronic device 901 may check a Q factor of the first sensor coil based on the measured waveform under the control of the processor 120 (e.g., the processor 522 in FIG. 5B).

In various embodiments, at operation 1807, the electronic device 901 may identify the presence of a foreign object based on the checked Q factor under the control of the processor 120 (e.g., the processor 522 in FIG. 5B).

In various embodiments, the operation of identifying, by the electronic device 901, the presence of a foreign object based on the checked Q factor at operation 1807 may include identifying the presence of a foreign object based on a threshold value of the Q factor of the first sensor coil included in the electronic device 901 and the checked Q factor of the first sensor coil.

For example, when a value of the checked Q factor of the first sensor coil is smaller than the threshold value of the Q factor of the first sensor coil, the electronic device 901 may identify that a foreign object is present under the control of the processor 120 (e.g., the processor 522 in FIG. 5B).

For example, when a value of the checked Q factor of the first sensor coil is greater than the threshold value of the Q factor of the first sensor coil, the electronic device 901 may identify that a foreign object is not present under the control of the processor 120 (e.g., the processor 522 in FIG. 5B).

In various embodiments, at operation 1809, the electronic device 901 may identify whether a foreign object is present between the electronic device 901 and the external electronic device 903 during the transmission and reception of wireless power based on the Q factor of the first sensor coil under the control of the processor 120 (e.g., the processor 522 in FIG. 5B).

In various embodiments, at operation 1809, the electronic device 901 may identify whether a foreign object is present between the electronic device 901 and the external electronic device 903 during the transmission and reception of wireless power based on operation 1807 under the control of the processor 120 (e.g., the processor 522 in FIG. 5B).

In various embodiments, when it is identified that a foreign object is present at operation 1809, the electronic device 901 may branch to operation 1811 under the control of the processor 120 (e.g., the processor 522 in FIG. 5B).

In various embodiments, when it is identified that a foreign object is not present at operation 1809, the electronic device 901 may branch to operation 1813 under the control of the processor 120 (e.g., the processor 522 in FIG. 5B).

In various embodiments, when it is identified that a foreign object is present, the electronic device 901 may stop transmitting the power using the first WPT coil under the control of the processor 120 (e.g., the processor 522 in FIG. 5B) at operation 1811.

In various embodiments, when it is identified that a foreign object is not present, the electronic device 901 may continue to transmit the power using the first WPT coil under the control of the processor 120 (e.g., the processor 522 in FIG. 5B) at operation 1813.

Figure 19:
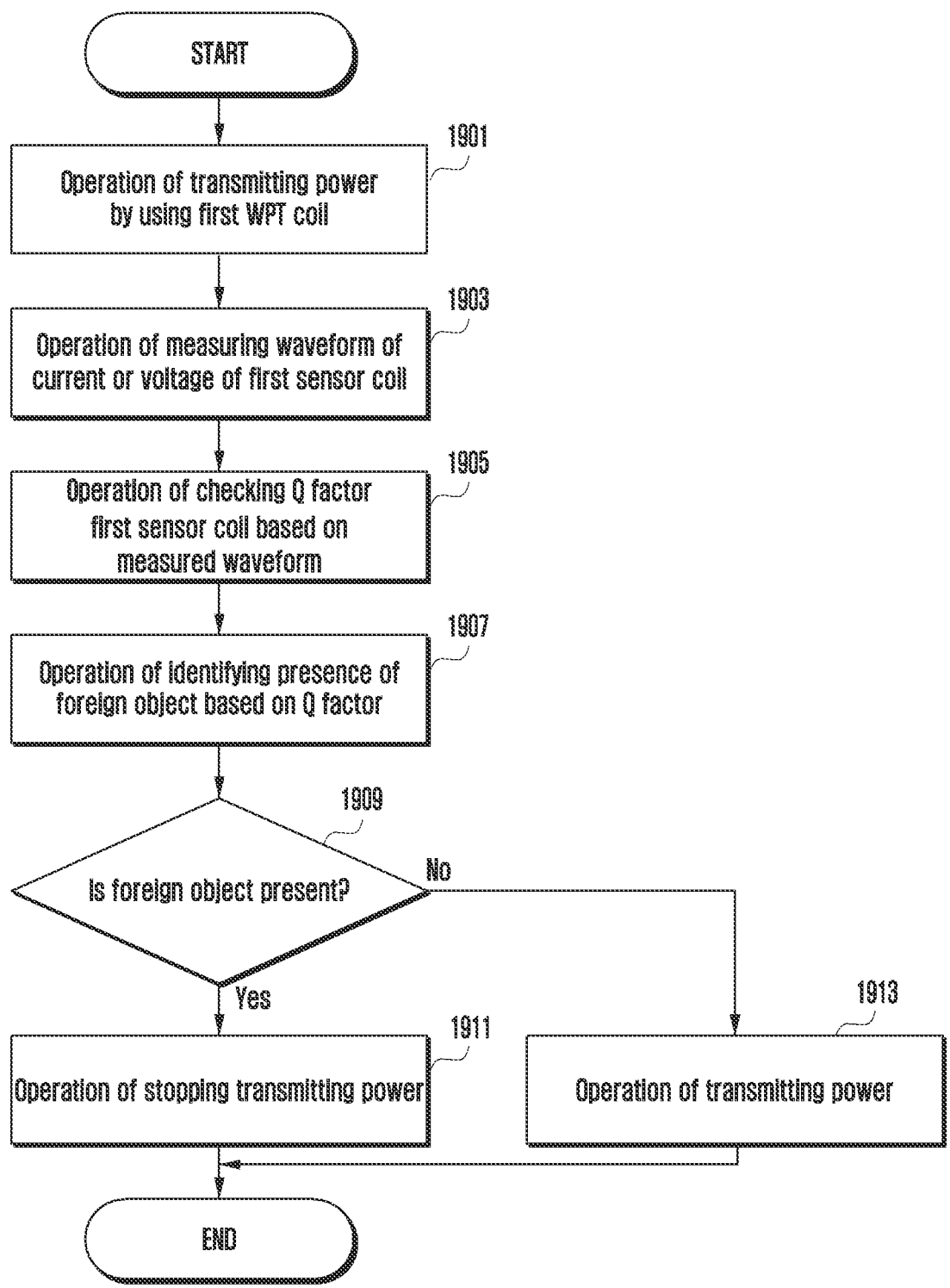
FIG. 19 is a flowchart illustrating a method of detecting a foreign object using a first sensor coil of an electronic device according to an embodiment of the disclosure.

FIG. 19 is a flowchart illustrating a method of detecting, by an electronic device, a foreign object using a first sensor coil according to an embodiment of the disclosure.

Referring to FIG. 19, the electronic device 901 is the same as the electronic device 901 in FIG. 18. The external electronic device 903 in FIG. 19 is the same as the external electronic device 903 in FIG. 18.

In various embodiments, at operation 1901, the electronic device 901 may transmit power by using the first WPT coil under the control of the processor 120 (e.g., the processor 522 in FIG. 5B).

When a wireless charging operation between the external electronic device 903 and the electronic device 901 is started, the electronic device 901 may transmit power by using the first WPT coil under the control of the processor 120 (e.g., the processor 522 in FIG. 5B).

In various embodiments, at operation 1903, the electronic device 901 may measure a waveform of a current or voltage of the first sensor coil under the control of the processor 120 (e.g., the processor 522 in FIG. 5B).

For example, while or after the external electronic device 903 performs a ping operation using the second sensor coil, at operation 1903, the electronic device 901 may measure an attenuation curve of a resonant frequency current (e.g., AC) applied to the first sensor coil or a voltage envelope of the sensor coil under the control of the processor 120 (e.g., the processor 522 in FIG. 5B), In various embodiments, at operation 1905, the electronic device 901 may check a Q factor of the first sensor coil based on the measured waveform under the control of the processor 120 (e.g., the processor 522 in FIG. 5B).

In various embodiments, at operation 1907, the electronic device 901 may identify the presence of a foreign object based on the checked Q factor under the control of the processor 120 (e.g., the processor 522 in FIG. 5B).

In various embodiments, the operation of identifying, by the electronic device 901, the presence of a foreign object based on the checked Q factor at operation 1907 may include identifying the presence of a foreign object based on a threshold value of the Q factor of the first sensor coil included in the electronic device 901 and the checked Q factor of the first sensor coil.

For example, when a value of the checked Q factor of the first sensor coil is smaller than the threshold value of the Q factor of the first sensor coil, the electronic device 901 may identify that a foreign object is present under the control of the processor 120 (e.g., the processor 522 in FIG. 5B).

For example, when a value of the checked Q factor of the first sensor coil is greater than the threshold value of the Q factor of the first sensor coil, the electronic device 901 may identify that a foreign object is not present under the control of the processor 120 (e.g., the processor 522 in FIG. 5B).

In various embodiments, at operation 1909, the electronic device 901 may identify whether a foreign object is present between the electronic device 901 and the external electronic device 903 during the transmission and reception of wireless power based on the Q factor of the first sensor coil under the control of the processor 120 (e.g., the processor 522 in FIG. 5B).

In various embodiments, at operation 1909, the electronic device 901 may identify whether a foreign object is present between the electronic device 901 and the external electronic device 903 during the transmission and reception of wireless power based on operation 1907 under the control of the processor 120 (e.g., the processor 522 in FIG. 5B).

In various embodiments, when it is identified that a foreign object is present at operation 1909, the electronic device 901 may branch to operation 1911 under the control of the processor 120 (e.g., the processor 522 in FIG. 5B).

In various embodiments, when it is identified that a foreign object is not present at operation 1909, the electronic device 901 may branch to operation 1913 under the control of the processor 120 (e.g., the processor 522 in FIG. 5B).

In various embodiments, when it is identified that a foreign object is present, at operation 1911, the electronic device 901 may stop transmitting the power using the first WPT coil under the control of the processor 120 (e.g., the processor 522 in FIG. 5B), In various embodiments, when it is identified that a foreign object is not present, at operation 1913, the electronic device 901 may continue to transmit the power using the first WPT coil under the control of the processor 120 (e.g., the processor 522 in FIG. 5B).

Figure 20:
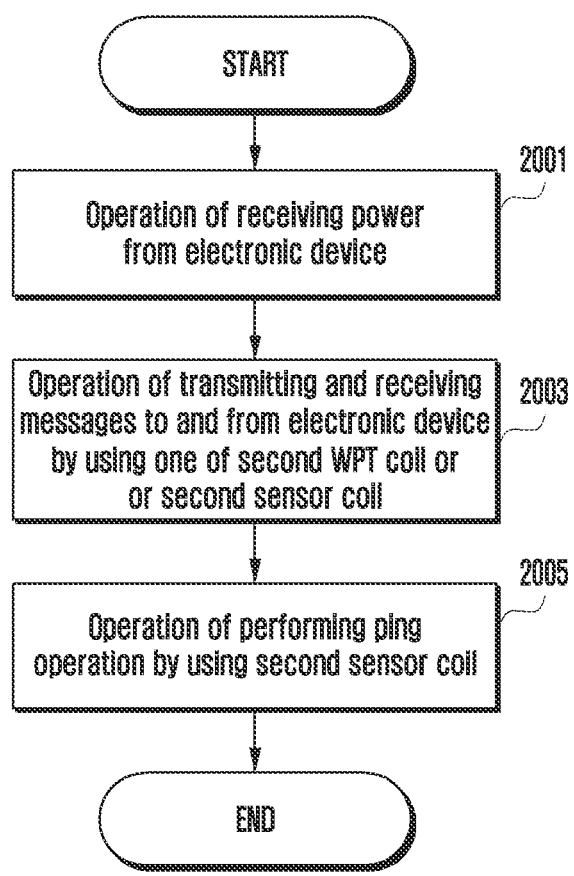
FIG. 20 is a flowchart illustrating a method of detecting a foreign object using a second sensor coil of an external electronic device according to an embodiment of the disclosure.

FIG. 20 is a flowchart illustrating a method of detecting, by an external electronic device, a foreign object using the second sensor coil according to an embodiment of the disclosure.

Referring to FIG. 20, at operation 2001, the external electronic device 903 may receive power from the electronic device 901 by using the second WPT coil under the control of the processor 120 (e.g., the processor 512 in FIG. 5A).

In various embodiments, when receiving the power from the electronic device 901, the external electronic device 903 may transmit a power reception message to the electronic device 901 by using at least one of the second WPT coil or the second sensor coil under the control of the processor 120 (e.g., the processor 512 in FIG. 5A) at operation 2003.

In various embodiments, if the external electronic device 903 does not include the second sensor coil, the external electronic device 903 may transmit the power reception message to the electronic device 901 by using the second WPT coil. If the external electronic device 903 transmits the power reception message to the electronic device 901 by using the second WPT coil, although the electronic device 901 includes both the first WPT coil and the first sensor coil, the electronic device 901 may receive the power reception message by using the first WPT coil.

In various embodiments, the electronic device 901 may include the first WPT coil and the first sensor coil. The external electronic device 903 may include the second WPT coil and the second sensor coil. The external electronic device 903 may transmit the power reception message to the electronic device 901 by using at least one of the second WPT coil or the second sensor coil. For example, if the external electronic device 903 transmits the power reception message to the electronic device 901 by using at least one of the second WPT coil or the second sensor coil, the electronic device 901 may receive the power reception message by using at least one of the first WPT coil or the first sensor coil. When the external electronic device 903 transmits the power reception message to the electronic device 901 by using the second WPT coil, the electronic device 901 may receive the power reception message by using the first WPT coil not the first sensor coil. When the external electronic device 903 transmits the power reception message to the electronic device 901 by using the second sensor coil, the electronic device 901 may receive the power reception message by using the first sensor coil not the first WPT coil.

In various embodiments, the power reception message may include information on a Q factor of the second sensor coil included in the external electronic device 903. The information on the Q factor of the second sensor coil included in the external electronic device 903 may include information on a reduction of the Q factor of the second sensor coil attributable to the electronic device 901 when a foreign object is not present, for example. In various embodiments, the information on the Q factor of the second sensor coil included in the external electronic device 903 is a predetermined value of the Q factor of the second sensor coil, for example, and may include a threshold value of the Q factor which is a criterion for identifying a foreign object.

In various embodiments, when the external electronic device 903 receives the power from the electronic device 901, operation 2003 of transmitting the power reception message to the electronic device 901 by using at least one of the second WPT coil or the second sensor coil may be omitted. The power reception message may be a message that provides notification that the external electronic device 903 receives the power from the electronic device 901.

In various embodiments, at operation 2005, the external electronic device 903 may perform a ping operation by using the second sensor coil under the control of the processor 120 (e.g., the processor 512 in FIG. 5A).

In various embodiments, at operation 2005, the external electronic device 903 may apply a resonant frequency current to the second sensor coil under the control of the processor 120 (e.g., the processor 512 in FIG. 5A). At this time, the external electronic device 903 may stop a current being input to the second sensor coil and apply the resonant frequency current to the second sensor coil.

In various embodiments, at operation 2005, the external electronic device 903 may periodically perform the ping operation using the second sensor coil while receiving the power from the electronic device 901 under the control of the processor 120 (e.g., the processor 512 in FIG. 5A).

In various embodiments, at operation 2005, the external electronic device 903 may perform the ping operation using the second sensor coil on a one-off basis under the control of the processor 120 (e.g., the processor 512 in FIG. 5A).

In various embodiments, the electronic device 901 capable of transmitting and receiving wireless power includes the WPT coil 601, the sensor coil 602 surrounding the WPT coil 601, and the processor 120 (e.g., the processor 512 in FIG. 5A) operatively coupled to the WPT coil 601 and the sensor coil 602. The processor 120 (e.g., the processor 512 in FIG. 5A) may control to transmit and receive power by using the WPT coil 601, may perform a ping operation by using the sensor coil 602, may control to measure a waveform of a current or voltage of the sensor coil 602 while or after performing the ping operation using the sensor coil 602, may control to check a Q factor of the sensor coil 602 based on the measured waveform, may identify the presence of a foreign object based on the checked Q factor, and may control power transmission using the WPT coil 601 based on a result of the identification of the presence of the foreign object.

In various embodiments, when a foreign object is not present, the processor 120 (e.g., the processor 512 in FIG. 5A) of the electronic device 901 may control to continue the power transmission using the WPT coil 601, In various embodiments, the processor 120 (e.g., the processor 512 in FIG. 5A) of the electronic device 901 may stop a current being input to the sensor coil 602, and may control to perform a ping operation by applying a resonant frequency current to the sensor coil 602.

In various embodiments, the processor 120 (e.g., the processor 512 in FIG. 5A) of the electronic device 901 may control to measure an attenuation curve of the resonant frequency current applied to the sensor coil 602 or a voltage envelope of the sensor coil 602.

In various embodiments, the processor 120 (e.g., the processor 512 in FIG. 5A) of the electronic device 901 may identify the presence of a foreign object based on a threshold value of the Q factor of the sensor coil 602 and the checked Q factor of the sensor coil 602.

In various embodiments, the processor 120 (e.g., the processor 512 in FIG. 5A) of the electronic device 901 may identify that a foreign object is present when a value of the checked Q factor of the sensor coil 602 is smaller than the threshold value of the Q factor of the sensor coil 602, and may identify that a foreign object is not present when a value of the checked Q factor of the sensor coil 602 is greater than the threshold value of the Q factor of the sensor coil 602.

In various embodiments, the processor 120 (e.g., the processor 512 in FIG. 5A) of the electronic device 901 may perform the ping operation using the sensor coil 602 periodically or once.

In various embodiments, when a foreign object is present, the processor 120 (e.g., the processor 512 in FIG. 5A) of the electronic device 901 may transmit a power transmission stop message by using the WPT coil 601 or the sensor coil 602.

In various embodiments, the processor 120 (e.g., the processor 512 in FIG. 5A) of the electronic device 901 may control to measure a waveform of a current or voltage of the sensor coil 602 in response to the power transmission operation of the external electronic device 903.

In various embodiments, the processor 120 (e.g., the processor 512 in FIG. 5A) of the electronic device 901 may transmit a power reception message or a power transmission message by using the WPT coil 601 or the sensor coil 602.

In various embodiments, a method of detecting, by the electronic device 901 capable of transmitting and receiving wireless power and including the WPT coil 601 and the sensor coil 602 surrounding the WPT coil 601, a foreign object using the sensor coil 602 may include an operation of controlling to transmit and receive power by using the WPT coil 601, an operation of performing a ping operation by using the sensor coil 602, an operation of controlling to measure a waveform of a current or voltage of the sensor coil 602 while or after performing the ping operation using the sensor coil 602, an operation of controlling to check a Q factor of the sensor coil 602 based on the measured waveform, an operation of identifying the presence of a foreign object based on the checked Q factor, and an operation of controlling power transmission using the WPT coil 601 based on a result of the identification of the presence of the foreign object.

In various embodiments, the method of detecting, by the electronic device 901 capable of transmitting and receiving wireless power and including the WPT coil 601 and the sensor coil 602 surrounding the WPT coil 601, a foreign object using the sensor coil 602 may further include an operation of controlling to continue the power transmission using the WPT coil 601 when a foreign object is not present.

In various embodiments, the method of detecting, by the electronic device 901 capable of transmitting and receiving wireless power and including the WPT coil 601 and the sensor coil 602 surrounding the WPT coil 601, a foreign object using the sensor coil 602 may further include an operation of stopping a current being input to the sensor coil 602 and controlling to perform the ping operation by applying a resonant frequency current to the sensor coil 602 in the operation of performing the ping operation.

In various embodiments, the method of detecting, by the electronic device 901 capable of transmitting and receiving wireless power and including the WPT coil 601 and the sensor coil 602 surrounding the WPT coil 601, a foreign object using the sensor coil 602 may further include an operation of controlling to measure an attenuation curve of a resonant frequency current applied to the sensor coil 602 or a voltage envelope of the sensor coil 602 in the operation of controlling to measure the waveform of the current or voltage of the sensor coil 602.

In various embodiments, the method of detecting, by the electronic device 901 capable of transmitting and receiving wireless power and including the WPT coil 601 and the sensor coil 602 surrounding the WPT coil 601, a foreign object using the sensor coil 602 may further include an operation of identifying the presence of a foreign object based on a threshold value of the Q factor of the sensor coil 602 and the checked Q factor of the sensor coil 602 in the operation of identifying the presence of a foreign object.

In various embodiments, the method of detecting, by the electronic device 901 capable of transmitting and receiving wireless power and including the WPT coil 601 and the sensor coil 602 surrounding the WPT coil 601, a foreign object using the sensor coil 602 may further include an operation of identifying that a foreign object is present when a value of the checked Q factor of the sensor coil 602 is smaller than the threshold value of the Q factor of the sensor coil 602 and an operation of identifying that a foreign object is not present when a value of the checked Q factor of the sensor coil 602 is greater than the threshold value of the Q factor of the sensor coil 602, in the operation of identifying the presence of a foreign object.

In various embodiments, the method of detecting, by the electronic device 901 capable of transmitting and receiving wireless power and including the WPT coil 601 and the sensor coil 602 surrounding the WPT coil 601, a foreign object using the sensor coil 602 may further include an operation of performing the ping operation using the sensor coil 602 periodically or once in the operation of performing the ping operation.

In various embodiments, the method of detecting, by the electronic device 901 capable of transmitting and receiving wireless power and including the WPT coil 601 and the sensor coil 602 surrounding the WPT coil 601, a foreign object using the sensor coil 602 may further include an operation of transmitting a power transmission stop message by using the WPT coil 601 or the sensor coil 602 when a foreign object is present.

In various embodiments, the method of detecting, by the electronic device 901 capable of transmitting and receiving wireless power and including the WPT coil 601 and the sensor coil 602 surrounding the WPT coil 601, a foreign object using the sensor coil 602 may further include an operation of controlling to measure a waveform of a current or voltage of the sensor coil 602 in response to a power transmission operation of the external electronic device 903.

In various embodiments, the method of detecting, by the electronic device 901 capable of transmitting and receiving wireless power and including the WPT coil 601 and the sensor coil 602 surrounding the WPT coil 601, a foreign object using the sensor coil 602 may further include an operation of transmitting a power reception message or a power transmission message by using the WPT coil 601 or the sensor coil 602.

The electronic device according to various embodiments disclosed in this document may be various types of devices. The electronic device may include a portable communication device (e.g., smartphone), a computer device, a portable multimedia device, a portable medical device, a camera, a wearable device, or home appliances, for example. The electronic device according to various embodiments of this document is not limited to the aforementioned devices.

Various embodiments of this document and terms used in the embodiments are not intended to limit the technical characteristics, described in this document, to specific embodiments, and should be understood as including various changes, equivalents or alternatives of a corresponding embodiment. In relation to the description of the drawings, similar reference numerals may be used for similar or related elements. A singular form of a noun corresponding to an item may include one item or a plurality of items unless explicitly described otherwise in the context. In this document, each of phrases, such as "A or B," "at least one of A and B," "at least one of A or B," "A, B or C," "at least one of A, B and C," and "at least one of A, B, or C," may include any one of items listed along with a corresponding one of the phrases or all possible combinations of the listed items. Terms, such as a "first," a "second," or "the first" or "the second," may be used to merely distinguish between a corresponding element and another corresponding element, and do not limit corresponding elements in another aspect (e.g., importance or sequence). If any (e.g., first) element is described as being "coupled" or "connected" to another (e.g, second) element along with a term "functionally" or "communicatively" or without such a term, this means that the any element may be coupled to another element directly (e.g., in a wired way), wirelessly, or through a third element.

The term "module" used in various embodiments of this document may include a unit implemented as hardware, software or firmware, and may be interchangeably used with a term, such as logic, a logical block, a part, or a circuit. The module may be an integrated part, or a minimum unit of the part or a part thereof, which performs one or more functions. For example, according to an embodiment, the module may be implemented in the form of an application-specific integrated circuit (ASIC).

Various embodiments of this document may be implemented as software (e.g., the program 140) including one or more instructions stored in a storage medium (e.g., the embedded (internal) memory 136 or the external memory 138) readable by a machine (e.g., the electronic device 101). For example, a processor (e.g., the processor 120) of a machine (e.g., the electronic device 101) may invoke at least one of the one or more instructions stored in the storage medium, and may execute the instruction. This enables the machine to operate to perform at least one function based on the invoked at least one instruction. The one or more instructions may include a code generated by a complier or a code executable by an interpreter. The storage medium readable by the machine may be provided in the form of a non-transitory storage medium. In this case, the term "non-transitory" merely means that the storage medium is a tangible device and does not include a signal (e.g., electromagnetic wave). The term does not distinguish between a case where data is semi-permanently stored in the storage medium and a case where data is temporally stored in the storage medium.

According to an embodiment, the method according to various embodiments disclosed in this document may be included in a computer program product and provided. The computer program product may be traded as a product between a seller and a purchaser. The computer program product may be distributed in the form of a machine-readable storage medium (e.g., a compact disc read only memory (CD-ROM) or may be distributed through an app store (e.g., PlayStore™) or directly between two user devices (e.g., smartphones) or online (e.g., download or upload). In the case of the online distribution, at least some of the computer program products may be at least temporarily stored or temporally generated in a machine-readable storage medium, such as the memory of the server of a manufacturer, the server of an app store or a relay server.

According to various embodiments, each (e.g., module or program) of the described elements may include a single entity or a plurality of entities, and some of a plurality of entities may be separately disposed in another element. According to various embodiments, one or more of the aforementioned elements or operations may be omitted or one or more other elements or operations may be added. Alternatively or additionally, a plurality of elements (e.g., modules or programs) may be integrated into a single element. In such a case, the integrated elements may perform one or more functions of each of the plurality of elements in the same or similar manner that the functions are performed by a corresponding one of the plurality of elements prior to the integration. According to various embodiments, operations performed by a module, a program or other elements may be executed sequentially, in parallel, repeatedly or heuristically, or one or more of the operations may be executed in different order or may be omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device capable of transmitting and receiving wireless power, the electronic device comprising:
   a wireless power transfer (WPT) coil;
   a sensor coil surrounding the WPT coil; and
   a processor operatively coupled to the WPT coil and the sensor coil,
   wherein the processor is configured to:
      control to transmit and receive power by using the WPT coil,
      perform a ping operation by using the sensor coil,
      control to measure a waveform of a current or voltage of the sensor coil while or after performing the ping operation using the sensor coil,
      control to check a Q factor of the sensor coil based on the measured waveform,
      identify presence of a foreign object based on the checked Q factor, and
      control the power transmission using the WPT coil based on a result of the identification of the presence of the foreign object.

2. The electronic device of claim 1, wherein the processor is further configured to control to continue the power transmission using the WPT coil when the foreign object is not present.

3. The electronic device of claim 1, wherein the processor is further configured to:
   stop a current being input to the sensor coil; and
   control to perform the ping operation by applying a resonant frequency current to the sensor coil.

4. The electronic device of claim 1, wherein the processor is further configured to control to measure an attenuation curve of a resonant frequency current applied to the sensor coil or a voltage envelope of the sensor coil.

5. The electronic device of claim 1, wherein the processor is further configured to identify the presence of the foreign object based on a threshold value of a Q factor of the sensor coil and the checked Q factor of the sensor coil.

6. The electronic device of claim 5, wherein the processor is further configured to:
   identify that the foreign object is present when a value of the checked Q factor of the sensor coil is smaller than the threshold value of the Q factor of the sensor coil; and
   identify that the foreign object is not present when the value of the checked Q factor of the sensor coil is greater than the threshold value of the Q factor of the sensor coil.

7. The electronic device of claim 1, wherein the processor is further configured to perform the ping operation using the sensor coil periodically or once.

8. The electronic device of claim 1, wherein the processor is further configured to transmit a power transmission stop message by using the WPT coil or the sensor coil when the foreign object is present.

9. The electronic device of claim 1, wherein the processor is further configured to control to measure the waveform of the current or voltage of the sensor coil in response to a power transmission operation of an external electronic device.

10. The electronic device of claim 1, wherein the processor is further configured to transmit a power reception message or a power transmission message by using the WPT coil or the sensor coil.

11. A method of detecting, by an electronic device comprising a wireless power transfer (WPT) coil and a sensor coil surrounding the WPT coil and capable of transmitting and receiving wireless power, a foreign object by using a sensor coil, the method comprising:
   controlling to transmit and receive power by using the WPT coil;
   performing a ping operation by using the sensor coil;
   controlling to measure a waveform of a current or voltage of the sensor coil while or after performing the ping operation using the sensor coil;
   controlling to check a Q factor of the sensor coil based on the measured waveform;
   identify presence of a foreign object based on the checked Q factor; and
   controlling the power transmission using the WPT coil based on a result of the identification of the presence of the foreign object.

12. The method of claim 11, further comprising controlling to continue the power transmission using the WPT coil when the foreign object is not present.

13. The method of claim 11, wherein performing the ping operation comprises:
   stopping a current being input to the sensor coil; and
   controlling to perform the ping operation by applying a resonant frequency current to the sensor coil.

14. The method of claim 11, wherein controlling to measure the waveform of the current or voltage of the sensor coil comprises controlling to measure an attenuation curve of a resonant frequency current applied to the sensor coil or a voltage envelope of the sensor coil.

15. The method of claim 11, wherein identifying the presence of the foreign object comprises identifying the presence of the foreign object based on a threshold value of a Q factor of the sensor coil and the checked Q factor of the sensor coil.

16. The method of claim 15, wherein identifying the presence of the foreign object further comprises:

identifying that the foreign object is present when a value of the checked Q factor of the sensor coil is smaller than the threshold value of the Q factor of the sensor coil; and identifying that the foreign object is not present when the value of the checked Q factor of the sensor coil is greater than the threshold value of the Q factor of the sensor coil.

17. The method of claim 11, wherein performing the ping operation comprises performing the ping operation using the sensor coil periodically or once.

18. The method of claim 11, further comprising transmitting a power transmission stop message by using the WPT coil or the sensor coil when the foreign object is present.

19. The method of claim 11, further comprising controlling to measure the waveform of the current or voltage of the sensor coil in response to a power transmission operation of an external electronic device.

20. The method of claim 11, further comprising transmitting a power reception message or a power transmission message by using the WPT coil or the sensor coil.

\* \* \* \* \*